US012809176B2

(12) United States Patent
Nguyen et al.

(10) Patent No.: US 12,809,176 B2
(45) Date of Patent: Nov. 24, 2026

(54) INTEGRATED OPTICAL COMPONENTS FOR HEAD MOUNTED DISPLAY DEVICES

(71) Applicant: Magic Leap, Inc., Plantation, FL (US)

(72) Inventors: Bach Nguyen, Coral Springs, FL (US); Vikramjit Singh, Pflugerville, TX (US); Ravi Kumar Komanduri, Austin, TX (US); Jason Allen Shultz, Miami, FL (US); Ryan Jason Ong, Austin, TX (US); Matthew Traub, Plantation, FL (US); Frank Y. Xu, Austin, TX (US)

(73) Assignee: Magic Leap, Inc., Plantation, FL (US)

( * ) Notice: Subject to any disclaimer, the term of this patent is extended or adjusted under 35 U.S.C. 154(b) by 225 days.

(21) Appl. No.: 18/686,632

(22) PCT Filed: Aug. 31, 2022

(86) PCT No.: PCT/US2022/042219
§ 371 (c)(1),
(2) Date: Feb. 26, 2024

(87) PCT Pub. No.: WO2023/034424
PCT Pub. Date: Mar. 9, 2023

(65) Prior Publication Data

US 2025/0138316 A1 May 1, 2025

Related U.S. Application Data

(60) Provisional application No. 63/239,119, filed on Aug. 31, 2021.

(51) Int. Cl.
*G02B 27/01* (2006.01)
*B29D 11/00* (2006.01)

(52) U.S. Cl.
CPC ..... *G02B 27/0172* (2013.01); *G02B 27/0179* (2013.01); *G02B 2027/0187* (2013.01)

(58) Field of Classification Search
CPC ............ G02B 27/0172; G02B 27/0179; G02B 2027/0187; G02B 1/11; G02B 1/14;
(Continued)

(56) References Cited

U.S. PATENT DOCUMENTS 6,099,283 A * 8/2000 Soane .............. B29D 11/00903
425/808
9,568,734 B1 * 2/2017 Giri .................... G02B 27/0081
(Continued)

FOREIGN PATENT DOCUMENTS

JP H07-175131 A 7/1995
JP H08-254604 A 10/1996
(Continued)

OTHER PUBLICATIONS

International Search Report and Written Opinion in International Appln. No. PCT/US2022/042219, mailed Feb. 8, 2023, 24 pages.
(Continued)

*Primary Examiner* — Mustak Choudhury
(74) *Attorney, Agent, or Firm* — Fish & Richardson P.C.

(57) ABSTRACT

In an example method for forming a variable optical viewing optics assembly (VOA) for a head mounted display, a prepolymer is deposited onto a substrate having a first optical element for the VOA. Further, a mold is applied to the prepolymer to conform the prepolymer to a curved surface of the mold on a first side of the prepolymer and to conform the prepolymer to a surface of the substrate on a second side of the prepolymer opposite the first side. Further, the prepolymer is exposed to actinic radiation sufficient to form a solid polymer from the prepolymer, such that the solid polymer forms an ophthalmic lens having a curved
(Continued)

surface corresponding to the curved surface of the mold, and the substrate and the ophthalmic lens form an integrated optical component. The mold is released from the solid polymer, and the VOA is assembled using the integrated optical component.

21 Claims, 16 Drawing Sheets

(58) Field of Classification Search
CPC .. G02B 3/0031; G02B 3/08; B29D 11/00009; B29D 11/00692; B29D 11/0073; B32B 7/12
See application file for complete search history.

(56) References Cited

U.S. PATENT DOCUMENTS

| | | | |
|---|---|---|---|
| 9,581,832 | B2* | 2/2017 | Pugh ........................ G02C 7/04 |
| 2009/0326167 | A1 | 12/2009 | Sawant et al. |
| 2011/0175598 | A1 | 7/2011 | Doering et al. |
| 2012/0062844 | A1 | 3/2012 | Svochak et al. |
| 2012/0236254 | A1 | 9/2012 | Pugh et al. |
| 2014/0268020 | A1 | 9/2014 | Pugh et al. |
| 2014/0340728 | A1 | 11/2014 | Taheri |
| 2014/0375789 | A1 | 12/2014 | Lou et al. |
| 2016/0231577 | A1* | 8/2016 | Mack ............... B29D 11/00009 |
| 2017/0039020 | A1 | 2/2017 | Jepsen et al. |
| 2017/0261768 | A1 | 9/2017 | Ambler et al. |
| 2017/0336539 | A1 | 11/2017 | Perreault et al. |
| 2018/0045966 | A1* | 2/2018 | Holland ........... B29D 11/00317 |
| 2018/0052320 | A1 | 2/2018 | Curtis et al. |
| 2018/0094098 | A1* | 4/2018 | Fujikawa ............... C08G 59/24 |
| 2018/0231778 | A1 | 8/2018 | Yoon et al. |
| 2021/0003872 | A1 | 1/2021 | Russell et al. |
| 2021/0356670 | A1* | 11/2021 | Oh ..................... G02B 27/0172 |

FOREIGN PATENT DOCUMENTS

| | | | |
|---|---|---|---|
| JP | H08-278476 | A | 10/1996 |
| JP | H09-95670 | A | 4/1997 |
| JP | H09-185009 | A | 7/1997 |
| JP | H10-264264 | A | 10/1998 |
| JP | 2002-182001 | A | 6/2002 |
| JP | 2017-036421 | A | 2/2017 |
| JP | 2019-510267 | A | 4/2019 |
| JP | 2020-157759 | A | 10/2020 |
| JP | 2021-501354 | A | 1/2021 |
| JP | 2021-509736 | A | 4/2021 |
| WO | WO 2014/021232 | A1 | 2/2014 |
| WO | WO 2017/151809 | A1 | 9/2017 |
| WO | WO 2019/136473 | A1 | 7/2019 |
| WO | 2020219518 | A1 | 10/2020 |
| WO | WO 2020/254628 | A1 | 12/2020 |
| WO | WO 2019/097895 | A1 | 1/2021 |

OTHER PUBLICATIONS

Extended European Search Report in European Appln. No. 22865508.0, mailed on Jun. 17, 2025, 10 pages.
Office Action in Japanese Appln. No. 2024-513212, mailed on Sep. 7, 2026, 19 pages (with English translation).

* cited by examiner

INTEGRATED OPTICAL COMPONENTS FOR HEAD MOUNTED DISPLAY DEVICES

CROSS-REFERENCE TO RELATED APPLICATION

This application is a National Stage Application of International Application No. PCT/US2022/042219, filed Aug. 31, 2022, which claims the benefit of U.S. Provisional Application No. 63/239,119 filed on Aug. 31, 2021, which is hereby incorporated by reference in its entirety.

TECHNICAL FIELD

This disclosure relates to integrated optical components for head mounted display devices (e.g., headsets for displaying virtual reality and/or augmented reality content) and methods for making the same.

BACKGROUND

Optical imaging systems, such as head mounted display devices, can include eyepieces that present projected images to a user. Eyepieces can be constructed using thin layers of one or more highly refractive materials. As examples, eyepieces can be constructed from one or more layers of highly refractive glass, silicon, metal, or polymer substrates.

In some cases, an eyepiece can be patterned (e.g., with one or more light diffractive structures), such that it projects an image according to a particular focal depth. For an example, to a user viewing a patterned eyepiece, the projected image can appear to be a particular distance away from the user.

Further, multiple eyepieces can be used in conjunction to project a simulated three-dimensional image. For example, multiple eyepieces can be layered one atop another, with each eyepiece having a different pattern and each eyepiece projecting a different depth layer of a volumetric image. Thus, the eyepieces can collectively present the volumetric image to the user across three-dimensions. This can be useful, for example, in presenting the user with a "virtual reality" or "augmented reality" environment.

SUMMARY

Systems and techniques for producing integrated optical components for head mounted display devices are described herein.

One or more of the described implementations can be used to produce optical components having fewer subcomponents, reduced dimensions, reduced weight, and/or fewer optical interfaces than would otherwise be possible (e.g., absent performance of the techniques and/or use of the systems described herein). Further, one or more of the described implementations can be used to produce optical components to a higher degree of precision (e.g., compared to those produced using other techniques and/or systems).

These systems and techniques can be beneficial, for example, in producing head mounted displays having enhanced optical performance characteristics. For example, head mounted displays having optical components produced according to the described techniques and systems can be used to present visual content according to a wide field of view (or volume of view) and/or according to a high degree of visual fidelity (e.g., by eliminating or otherwise reducing the degree of haze or light scattering that could adversely impact the visual quality of the displayed content). Further, the described implementations can enable head mounted displays to be produced more quickly and/or at a lower cost (e.g., by reducing the complexity of the display and/or the number of steps that are performed to produce the display). Further, the described implementations can be used to produce head mounted display that are less bulky and more comfortable for users to wear.

In an aspect, a method of forming a variable optical viewing optics assembly (VOA) for a head mounted display includes providing a substrate comprising a first optical element for the VOA; depositing a prepolymer onto the substrate; applying a mold to the prepolymer to conform the prepolymer to a curved surface of the mold on a first side of the prepolymer and to conform the prepolymer to a surface of the substrate on a second side of the prepolymer opposite the first side; while applying the mold to the prepolymer, exposing the prepolymer to actinic radiation sufficient to form a solid polymer from the prepolymer, the solid polymer forming an ophthalmic lens having a curved surface corresponding to the curved surface of the mold, the substrate and the ophthalmic lens forming an integrated optical component; releasing the mold from the solid polymer; and assembling the VOA using the integrated optical component.

Implementations of this aspect can include one or more of the following features.

In some implementations, the first optical element can include a segmented dimmer configured to selectively modulate an intensity of light transmitted by the VOA.

In some implementations, the first optical element can include an illumination layer configured to emit light along an optical axis of the VOA.

In some implementations, the first optical element can include at least one layer that is part of an eye tracking assembly configured to track a motion of a user's eye while the head mounted display is worn by the user.

In some implementations, the first optical element can include one or more lenses.

In some implementations, the method can also include, prior to depositing the prepolymer onto the substrate, cleaning the surface of the substrate.

In some implementations, cleaning the substrate can include at least one of: applying an aqueous acidic solution and an aqueous basic solution to the surface of the substrate, applying an organic solvent to the surface of the substrate, sonicating the surface of the substrate, exposing the surface of the substrate to a plasma, or exposing the surface of the substrate to ultraviolet light and/or ozone.

In some implementations, the method can also include, prior to depositing the prepolymer onto the substrate, depositing a material onto the surface of the substrate using vapor deposition.

In some implementations, the material can include a silane coupling agent.

In some implementations, the method can also include, prior to depositing the prepolymer onto the substrate, depositing a material onto the surface of the substrate using vapor liquid, where the material includes a monomer having one or more functional groups.

In some implementations, the one or more functional groups can include at least one of alkyl, carboxyl, carbonyl, hydroxyl, or alkoxy.

In some implementations, the material can be deposited onto the surface of the substrate by at least one of: ink jetting the material onto the surface, spin coating the material onto the surface, or spraying the material onto the surface.

In some implementations, the prepolymer can include at least one of: an epoxy vinyl ester, or cyclic aliphatic epoxy.

In some implementations, the prepolymer can further include at least one of a photoinitiator or a co-reactant for promoting a curing of the prepolymer.

In some implementations, exposing the prepolymer to actinic radiation can include exposing the prepolymer to actinic radiation having a wavelength of 365 nm and an intensity between 0.1 J/cm$^2$ and 10 J/cm$^2$.

In some implementations, exposing the prepolymer to actinic radiation can include exposing the prepolymer to actinic radiation having a wavelength between 310 nm and 410 nm and an intensity between 0.1 J/cm$^2$ and 100 J/cm$^2$.

In some implementations, the method can further include, while exposing the prepolymer to actinic radiation, applying heat of the prepolymer.

In some implementations, applying heat of the prepolymer can include heating the prepolymer to a temperature between 40 °C and 120 °C.

In some implementations, the surface of the substrate can be planar. Further, the ophthalmic lens can include a planar surface corresponding to the planar surface of the substrate. The planar surface of the ophthalmic lens can be opposite the curved surface of the ophthalmic lens.

In some implementations, the surface of the substrate can be curved. Further, the ophthalmic lens include a second curved surface corresponding to the curved surface of the substrate. The second curved surface of the ophthalmic lens can be opposite the curved surface of the ophthalmic lens.

In some implementations, the ophthalmic lens can have an optical power in a range from +1 D to +1.5 D.

In some implementations, the ophthalmic lens can have an optical power in a range from −1 D to −1.5 D.

In some implementations, the ophthalmic lens can have an optical power in a range from +0.5 D to +4 D.

In some implementations, the ophthalmic lens can have an optical power in a range from −0.5 D to −4 D.

In some implementations, the ophthalmic lens can have a radius of curvature between 400 mm and 450 mm.

In some implementations, the ophthalmic lens can have an aperture size of between 25 mm and 50 mm.

In some implementations, the ophthalmic lens can have an aperture size of between 25 mm and 95 mm.

In some implementations, the ophthalmic lens can have a refractive index between 1.5 and 1.6.

In some implementations, the ophthalmic lens can have a radius of curvature greater than 200 mm.

In some implementations, the ophthalmic lens can have an aperture size greater than 5 mm.

In some implementations, the ophthalmic lens can have a refractive index between 1.5 and 1.75.

In some implementations, the ophthalmic lens can have a radius of curvature between 150 mm and 1000 mm.

In some implementations, the ophthalmic lens can have a focal length between 25 cm and 2 m.

In some implementations, the ophthalmic lens can include a Fresnel lens on a plano surface.

In some implementations, the Fresnel lens can have a lens ridge height between 25 μm and 1000 μm.

In some implementations, the method can include applying at least one of an anti-reflecting coating or a protective coating to a surface of the integrated optical component.

In some implementations, at least one of the prepolymer or the substrate can include a photochromic material.

In some implementations, at least one of the prepolymer or the substrate can include an electrochromic material.

In another aspect, a method of forming a variable optical viewing optics assembly (VOA) for a head mounted display includes providing a substrate; depositing a prepolymer onto the substrate; applying a mold to the prepolymer to conform the prepolymer to a curved surface of the mold on a first side of the prepolymer and to conform the prepolymer to a surface of the substrate on a second side of the prepolymer opposite the first side; while applying the mold to the prepolymer, exposing the prepolymer to actinic radiation sufficient to form a solid polymer from the prepolymer, the solid polymer forming an ophthalmic lens having a curved surface corresponding to the curved surface of the mold; releasing the solid polymer from the mold and the substrate; securing the solid polymer to an optical element to form an integrated optical component; and assembling the VOA using the integrated optical component.

Implementations of this aspect can include one or more of the following features.

In some implementations, securing the solid polymer to the optical element can include applying a bonding agent to a surface of the optical element, and applying the solid polymer onto the bonding agent.

In some implementations, the bonding agent can include a liquid.

In some implementations, can include a dry substance.

In some implementations, the optical element can include a segmented dimmer configured to selectively modulate an intensity of light transmitted by the VOA.

In some implementations, the optical element can include an illumination layer configured to emit light along an optical axis of the VOA.

In some implementations, the optical element can include at least one layer that is part of an eye tracking assembly configured to track a motion of a user's eye while the head mounted display is worn by the user.

In some implementations, the optical element can include one or more lenses.

In some implementations, the method can further include, prior to securing the solid polymer to the optical element, cleaning the optical element.

In some implementations, cleaning the optical element can include at least one of: applying an aqueous acidic solution and an aqueous basic solution to a surface of the optical element, applying an organic solvent to the surface of the surface of the optical element, sonicating the surface of the surface of the optical element, exposing the surface of the surface of the optical element to plasma, or exposing the surface of the optical element to ultraviolet light and/or ozone.

In some implementations, the method can further include, prior to securing the solid polymer to the optical element, depositing a material onto the optical element using vapor deposition.

In some implementations, the material can include a silane coupling agent.

In some implementations, the prepolymer can include at least one of an epoxy vinyl ester, or cyclic aliphatic epoxy.

In some implementations, the prepolymer can further include at least one of a photoinitiator or a co-reactant for promoting a curing of the prepolymer.

In some implementations, exposing the prepolymer to actinic radiation can include exposing the prepolymer to actinic radiation having a wavelength of 365 nm and an intensity between 0.1 J/cm$^2$ and 10 J/cm$^2$.

In some implementations, exposing the prepolymer to actinic radiation can include exposing the prepolymer to actinic radiation having a wavelength between 310 nm and 410 nm and an intensity between 0.1 J/cm$^2$ and 100 J/cm$^2$.

In some implementations, the method can further include, while exposing the prepolymer to actinic radiation, applying heat of the prepolymer.

In some implementations, applying heat of the prepolymer can include heating the prepolymer to a temperature between 40 °C and 120 °C.

In some implementations, the surface of the substrate can be planar. Further, the ophthalmic lens can include a planar surface corresponding to the planar surface of the substrate. The planar surface of the ophthalmic lens can be opposite the curved surface of the ophthalmic lens.

In some implementations, the surface of the substrate can be curved. Further, the ophthalmic lens can include a second curved surface corresponding to the curved surface of the substrate. The second curved surface of the ophthalmic lens can be opposite the curved surface of the ophthalmic lens.

In some implementations, the ophthalmic lens can have an optical power in a range from +1 D to +1.5 D.

In some implementations, the ophthalmic lens can have an optical power in a range from −1 D to −1.5 D.

In some implementations, the ophthalmic lens can have an optical power in a range from +0.5 D to +4 D.

In some implementations, the ophthalmic lens can have an optical power in a range from −0.5 D to −4 D.

In some implementations, the ophthalmic lens can have a radius of curvature between 400 mm and 450 mm.

In some implementations, the ophthalmic lens can have an aperture size of between 25 mm and 50 mm.

In some implementations, the ophthalmic lens can have a refractive index between 1.5 and 1.6.

In some implementations, the ophthalmic lens can have a radius of curvature greater than 200 mm.

In some implementations, the ophthalmic lens can have an aperture size greater than 5 mm.

In some implementations, the ophthalmic lens can have a refractive index between 1.5 and 1.75.

In some implementations, the ophthalmic lens can have a radius of curvature between 150 mm and 1000 mm.

In some implementations, the ophthalmic lens can have a focal length between 25 cm and 2 m.

In some implementations, the ophthalmic lens can include a Fresnel lens on a plano surface.

In some implementations, the Fresnel lens can have a lens ridge height between 25 μm and 1000 μm.

In some implementations, the prepolymer can include a photochromic material.

In some implementations, the prepolymer can include an electrochromic material.

In another aspect, a variable optical viewing optics assembly (VOA) for a head mounted display includes an eyepiece configured to display images toward a user side of the head mounted display during use of the head mounted display; and an integrated optical component arranged on a world side of the eyepiece, the integrated optical component including a segmented dimmer and an ophthalmic lens disposed on a surface of the segmented dimmer, the ophthalmic lens having a convex surface and an optical power in a range from +0.5 D to +4 D.

Implementations of this aspect can include one or more of the following features.

In some implementations, the segmented dimmer can include one or more dimmer layers configured to selectively modulate an intensity of light transmitted along an optical axis of the VOA.

In some implementations, the integrated optical component can be configured to focus at least some of the light emitted by the eyepiece onto an eye of the user during use of the head mounted display.

In some implementations, the VOA can also include one or more electrical traces disposed between the segmented dimmer and the ophthalmic lens.

In some implementations, the segmented dimmer can include a first layer having an electrochromic material.

In some implementations, the segmented dimmer can include a first electrically conductive layer and a second electrically conductive layer, where the first layer is disposed between the first electrically conductive layer and the second electrically conductive layer.

In some implementations, the segmented dimmer can include an ion transfer layer disposed between the first layer and the second electrically conductive layer.

In some implementations, the segmented dimmer can include an ion storage layer disposed between the ion transfer layer and the second electrically conductive layer.

In another aspect, a variable optical viewing optics assembly (VOA) for a head mounted display includes an eyepiece configured to display images toward a user side of the head mounted display during use of the head mounted display; and an integrated optical component arranged on the user side of the eyepiece, the integrated optical component comprising an illumination layer and an ophthalmic lens disposed on a surface of the illumination layer, the ophthalmic lens having a concave surface and an optical power in a range from −0.5 D to −4 D.

In some implementations, the illumination layer can be configured to emit light along an optical axis of the VOA.

In some implementations, the integrated optical component can be configured to focus at least some of the light emitted by the eyepiece onto an eye of the user during use of the head mounted display.

In some implementations, the VOA can also include one or more electrical traces disposed between the segmented dimmer and the ophthalmic lens.

In some implementations, the ophthalmic lens can include a photochromic material.

In some implementations, the ophthalmic lens can include an electrochromic material.

The details of one or more embodiments are set forth in the accompanying drawings and the description below. Other features and advantages will be apparent from the description and drawings, and from the claims.

DESCRIPTION OF DRAWINGS

FIGS. 11A and 111B are diagrams of example electrochromic optical components with respective optical sub-components formed and/or secured thereto.

DETAILED DESCRIPTION

System and techniques for producing integrated optical components for head mounted display devices are described herein.

In some implementations, the system and techniques described herein can be used to produce optical components having fewer sub-components, reduced dimensions, reduced weight, and/or fewer optical interfaces than would otherwise be possible (e.g., absent performance of the techniques and/or use of the systems described herein). Further, one or more of the described implementations can be used to produce optical components to a higher degree of precision (e.g., compared to those produced using other techniques and/or systems).

In some implementations, an integrated optical component can refer to an assembly having multiple constituent optical sub-components (each configured to alter the state of light in a particular manner) that have been combined together into a single unitary device. As an example, an integrated optical component can include one or more optical layers or other sub-components that have been secured to one another to form a single optical "stack" that can be handled, transported, and/or used as a single item. In some implementations, an integrated optical component can be incorporated a larger system (e.g., as a part in a manufacturing or assembly process) to provide particular functionality for that system.

In some implementations, an integrated optical component can include one or more constituent transmissive optical components (e.g., lenses, filters, windows, optical floats, prisms, polarizes, beam splitters, wave plates, fiber optics, etc.) and/or one or more constituent reflective optical components (e.g., mirrors, reflectors, etc.), each configured to alter the state of light in a particular manner. Further, the constituent components can be arranged relative to one another, such that they collectively receive and/or generate light, alter the state of the light, and output the altered light to achieve a particular optical effect.

In some implementations, one or more integrated optical components can be incorporated into an optical imaging system, such as a head mounted display device. As an example, one or more integrated optical components can be used to form a viewing optics assembly (VOA) having an eyepiece that is configured to project an image to a user according to a particular focal depth. Further, multiple eyepieces can be used in conjunction to project a simulated three-dimensional image (e.g., to present volumetric image to the user across three-dimensions), such as to render a virtual reality or augmented reality environment. Further, in some implementations, a VOA can transmit ambient light from a world side of a display device to a user side of the display device (e.g., to enable the user to view his surroundings in conjunction with the projected images).

Figure 1:
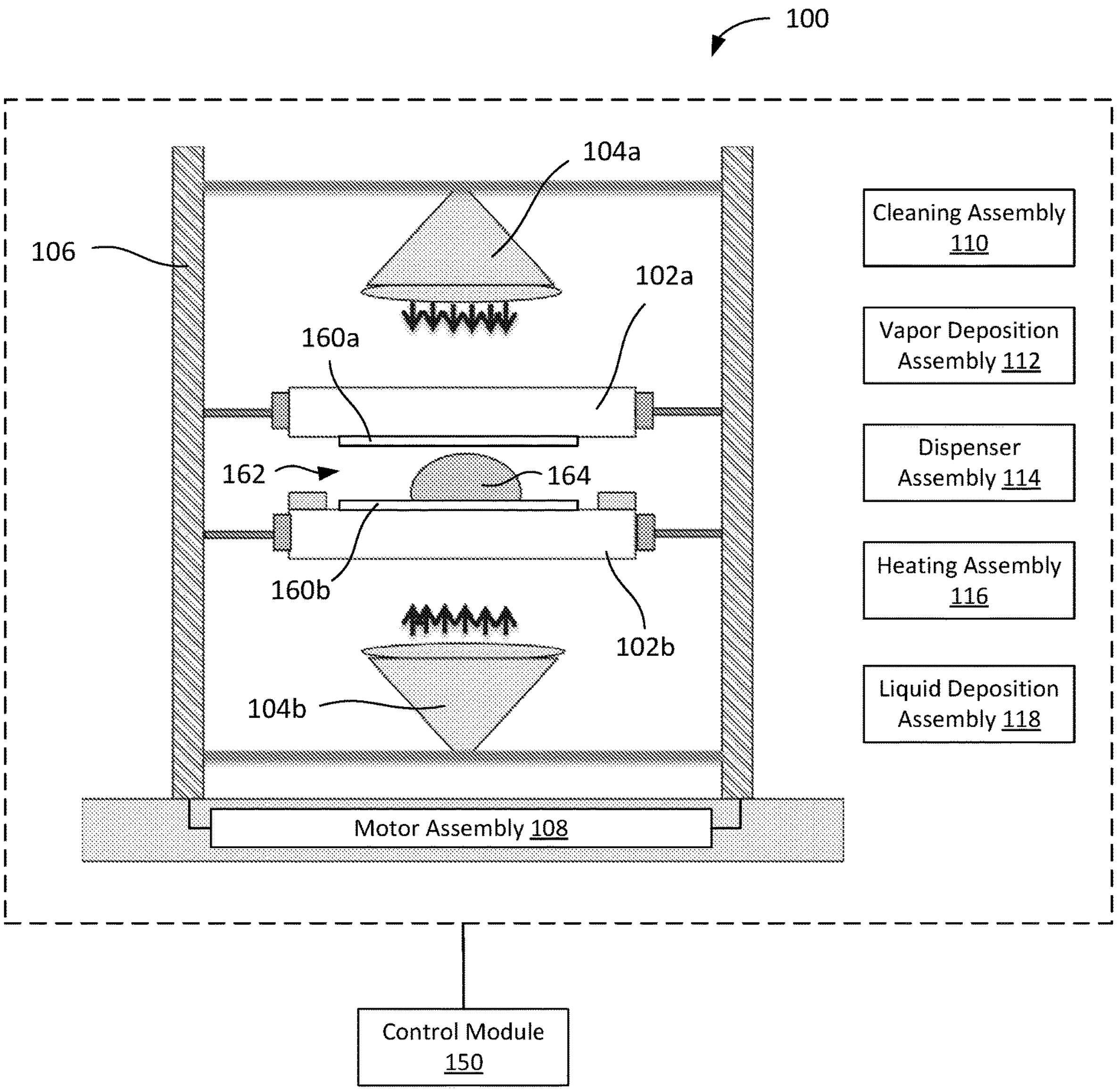
FIG. 1 is a diagram of an example system for producing optical components.

An example system 100 for producing optical components is shown in FIG. 1. The system 100 includes actuable stages 102*a* and 102*b*, light sources 104*a* and 104*b*, and a support frame 106. Further, the system 100 includes a motor assembly 108, a cleaning assembly 110, a vapor deposition assembly 112, a dispenser assembly 114, and a heating assembly 116, a liquid deposition assembly 118, and a control module 150.

In some implementations, the system 100 can be configured to form an optical component directly on another optical component, such that the two optical components are directly secured to one another without any adhesive layers and or any other intervening layers between them. This can be beneficial, for example, in reducing the dimensions, weight, and/or complexity of an integrated optical component incorporating the optical components. This can also be beneficial, for example, in reducing the number of optical interfaces within an integrated optical component, which can adversely impact the optical performance of the integrated optical component (e.g., due to Fresnel reflections at each optical interface).

In some implementations, the system 100 can be configured to form optical components individually. These optical components can be subsequently secured to one another (e.g., via one or more adhesive layers) to form an optical assembly. This can be beneficial, for example, in enabling optical assemblies to be performed in a modular manner.

During operation of the system 100, two structures 160*a* and 160*b* are secured to the actuable stages 102*a* and 102*b*, respectively, such that structures 160*a* and 160*b* face each other across a gap volume 162 between them. In some implementations, the structures 160*a* and 160*b* can be secured to the actuable stages 102*a* and 102*b* via vacuum force. For example, the actuable stages 102*a* and 102*b* can include one or more vacuum chucks configured to selectively generate a vacuum (e.g., along the surface of the actuable stages 102*a* and 102*b* facing the gap volume 162), such that the structures 160*a* and 160*b* are pulled towards and secured against the actuable stages 102*a* and 102*b*. In some implementations, the structures 160*a* and 160*b* can be secured to the actuable stages 102*a* and 102*b* via a mechanical chuck having one or more pins, clamps, brackets, or other physical fastening mechanisms.

In some implementations, at least one of the structures 160*a* and 160*b* can be a substrate upon which an optical component is to be formed. Further, in some implementations, a substrate can include at least a part of another optical component. For example, the substrate can include one or more sub-components of an integrated optical component, such as one or more transmissive optical elements and/or reflective optical elements. This enables an integral optical component to be formed, whereby one optical sub-component directly abuts another optical sub-component, without any adhesive layers and/or any other intervening layers between them.

In some implementations, a substrate can include or more layers of material, upon which the optical component is formed and from which the optical component is removed after formation. This enables optical components to be formed individually, and then secured to one or more other optical components (e.g., to form an optical stack).

In some implementations, at least one of the structures 160*a* and 160*b* can be a mold structure that is configured to impart a particular shape on the formed optical component. As an example, the structures 160*a* and 160*b* can include surfaces having a particular pattern (e.g., flat regions, curved regions, grooves, protrusions, gratings, etc.) that impart a corresponding pattern of the optical component. In some cases, the structures 160*a* and 160*b* can define a particular shape and pattern, such that the resulting polymer is suitable for use as an optical component in an optical imaging system (e.g., as a part of an integrated optical component used to form an eyepiece of a head mounted display device).

Further, during operation of the system 100, a prepolymer material 164 (e.g., a photopolymer or light-activated resin that hardens when exposed to light) is dispensed between the structures 160*a* and 160*b* by the dispenser assembly 114. The dispenser assembly 114 can include, for example, one or more pipettes, syringes, pumps, piezoelectric nozzles, and/or other mechanisms configured to dispense a metered amount of the prepolymer material 164 onto the structures 160*a* and/or the 160*b*.

The volume of the prepolymer material 164 that is dispensed by the dispenser assembly 114 can vary, depending on the desired volume of the resulting cured polymer. As an example, if the cured polymer is intended to be used as a single ophthalmic lens for use in a head mounted display device, approximately 100 μL to 2 mL of material can be dispensed onto the structures 160*a* and/or the 160*b*, in at least some implementations. However, in practice, any volume of material can be dispensed, depending on the intended application.

In some implementations, the prepolymer material 164 can include a resin material, such as an epoxy vinyl ester. The resin can include a vinyl monomer (e.g., methyl metacrylate) and/or difunctional or trifunctional vinyl monomers (e.g., diacrylates, triacrylates, dimethacrylates, etc.), with or without aromatic molecules in the monomer. In some implementations, the prepolymer material 164 can have a refractive index ranging from approximately 1.5 to 1.7. In some implementations, the prepolymer material 164 can include monomer having one or more functional groups such as alkyl, carboxyl, carbonyl, hydroxyl, and/or alkoxy.

In some implementations, the prepolymer material 164 can include a cyclic aliphatic epoxy containing resin can be cured using ultraviolet light and/or heat. Further, the prepolymer material 164 can include an ultraviolet cationic photoinitiator and a co-reactant to facilitate efficient ultraviolet curing in ambient conditions.

Further, the structures 160*a* and 160*b* are moved in proximity with one another (e.g., by moving the actuable stages 102*a* and/or 102*b* along the support frame 106 using the motor assembly 108), such that the prepolymer material 164 is enclosed by the structures 160*a* and 160*b*. The motor assembly 108 can include, or more one or more motors, actuators, etc. configured to move the actuable stages 102*a* and/or 102*b* relative to the support frame 106.

The prepolymer material 164 is then cured (e.g., by exposing the prepolymer material 164 to light from the light sources 104*a* and/or 104*b*, and/or heat from the heating assembly 116), forming a cured polymer having one or more features defined by the structures 160*a* and 160*b*. After the prepolymer material 164 has been cured, the structures 160*a* and 160*b* are moved away from each other (e.g., by moving the actuable stages 102*a* and/or 102*b* along the support frame 106), and the cured polymer is extracted.

In general, the actuable stages 102*a* and 102*b* are configured to support the structures 160*a* and 160*b*, respectively. Further, the actuable stages 102*a* and 102*b* are configured to manipulate the structures 160*a* and 160*b*, respectively, in one or more dimensions to control the gap volume 162 between the structures 160*a* and 160*b*.

For instance, in some cases, the actuable stage 102*a* can translate the structure 160*a* along one or more axes. As an example, the actuable stage 102*a* can translate the structure 160*a* along an x-axis, a y-axis, and/or a z-axis in a Cartesian coordinate system (i.e., a coordinate system having three orthogonally arranged axes). In some cases, the actuable stage 102*a* can rotate or tilt the structure 160*a* about one or more axes. As an example, the actuable stage 102*a* can rotate the structure 160*a* along an x-axis (e.g., to "roll" the structure 160*a*), a y-axis (e.g., to "pitch" the structure 160*a*), and/or a z-axis (e.g., to "yaw" the structure 160*a*) in a Cartesian coordinate system. Translation and/or rotation with respect to one or more other axes are also possible, either in addition to or instead of those described above. Similarly, the actuable stage 102*b* can also translate the structure 160*b* along one or more axes and/or rotate the structure 160*b* about one or more axes.

In some cases, the actuable stages 102*a* can manipulate the structure 160*a* according to one or more degrees of freedom (e.g., one, two, three, four, or more degrees of freedom). For instance, the actuable stage 102*a* can manipulate the structure 160*a* according to six degrees of freedom (e.g., translation along an x-axis, y-axis, and z-axis, and rotation about the x-axis, y-axis, and z-axis). Manipulation according to one or more other degrees of freedom is also possible, either in addition to or instead of those described above. Similarly, the actuable stage 102*b* can also manipulate the structure 160*b* according to one or more degrees of freedom In the example shown in FIG. 1, the actuable 102*a* and 102*b* can both be moved relative to the support frame 106 to control the gap volume 162. In some cases, however, one of the actuable stages can be moved relative to the support frame 106, while the other can remain static with respect to the support frame 106. For example, in some cases, the actuable stage 102*a* can be configured to translate in one or more dimensions relative to the support frame 106 through the motor assembly 108, while the actuable stage 102*b* can be held static with respect to the support frame 106.

In general, the light sources 106*a* and 106*b* are configured to generate radiation (e.g., actinic radiation) at one or more wavelengths suitable for photocuring the prepolymer material 164. The one or more wavelengths can differ, depending on the type of prepolymer material used. For example, in some cases, a photocurable material (e.g., an ultraviolet light-curable liquid silicone elastomer such as Poly(methyl methacrylate) or Poly(dimethylsiloxane)) can be used, and correspondingly the light source can be configured to generate radiation having a wavelength in a range from 315 nm to 430 nm (e.g., 365 nm) to photocure the photocurable material. Further, in some implementations, the radiation can have an intensity between 0.1 $J/cm^2$ and 10 $J/cm^2$.

As another example, the light source can be configured to generate radiation having a wavelength in a range from 310 nm to 310 nm. Further, the radiation can have an intensity between 0.1 $J/cm^2$ and 100 $J/cm^2$ In some cases, one or more of the structures 160*a* and 160*b* and/or the actuable stages 102*a* and 102*b* can be transparent, or substantially transparent to radiation at the suitable for photocuring the photocurable material, such that radiation from the light sources 104*a* and/or 104*b* can pass through the structures 160*a* and 160*b* and/or the actuable stages 102*a* and 102*b* and impinge upon the photocurable material.

Further, as described above, the system 100 can apply heat to the prepolymer material 164 during the curing process using the heating assembly 116. This can be beneficial, for example, in facilitating the curing process. For instance, in some cases, both heat and light can be used to cure the prepolymer material 164. For example, the application of heat can be used to accelerate the curing process, make the curing process more efficient, and/or make the curing processes more consistent. In some cases, the curing process can be performed using heat instead of light. For example, the application of heat can be used to cure the prepolymer material 164, and a light source need not be used.

In some implementations, the heating assembly 116 can include one or more metal heating elements (e.g., nichrome or resistance wire), ceramic heating elements (e.g., molybdenum disilicide or PTC ceramic elements), polymer PTC heating elements, composite heating elements, or a combination thereof. In some implementations, the heating assembly 116 can be configured to heat the prepolymer material 164 to a temperature between 40 °C and 120 °C.

In some implementations, the system 100 can include a cleaning assembly 110 configured to clean at least a portion of the structures 160*a* and/or 160*b* prior to dispensing the prepolymer material 164 onto the structures 160*a* and/or 160*b*. This can be beneficial, for example, in reducing a presence of impurities in the cured polymer (which can adversely affect the optical performance of the cured polymer), and/or reducing a presence of impurities between the cured polymer and the structures 160*a* and/or 160*b* (which can adversely affect an adhesion between them).

As an example, the cleaning assembly 110 can be configured to "wet clean" at least a portion of the structures 160*a* and/or 160*b* (e.g., by depositing an organic solvent, such as alcohol, or depositing a combination of a aqueous basic solution and aqueous acidic solution onto one or more surfaces of structures 160*a* and/or 160*b* (e.g., using one or more pipettes, syringes, pumps, piezoelectric nozzles, etc.). As another example, the cleaning assembly 110 can be configured to sonicate at least a portion of the structures 160*a* and/or 160*b* (e.g., by directing ultrasonic energy towards one or more surfaces of structures 160*a* and/or 160*b* using a piezoelectric transducer or actuator, or sonicator). As another example, the cleaning assembly 110 can be configured to plasma etch at least a portion of the structures 160*a* and/or 160*b* (e.g., by directing a stream of glow discharge (plasma) of an appropriate gas mixture towards one or more surfaces of structures 160*a* and/or 160*b*). As another example, the cleaning assembly 110 can be configured to expose at least a portion of the structures 160*a* and/or 160*b* to ultraviolet light (e.g., using one or more ultraviolet light sources) and ozone concurrently.

In some implementations, the system 100 can also include a vapor deposition assembly 112 configured to deposit additional material onto at least a portion of the structures 160*a* and/or 160*b* prior to dispensing the prepolymer material 164 onto the structures 160*a* and/or 160*b*. In some implementations, this is can facilitate a strong adhesive bond between the cured polymer and the structures 160*a* and/or 160*b*, which may be particularly beneficial if the cured polymer is intended to be permanently attached to the structures 160*a* and/or 160*b*. In some implementations, this is can reduce surface energy of the structures 160*a* and/or

160*b*, which may be particularly beneficial if the cured polymer is intended to be released from the structures 160*a* and/or 160*b* after formation.

In some implementations, material can be deposited onto the structures 160*a* and/or 160*b* via vapor deposition subsequent to cleaning the structures 160*a* and/or 160*b*. In some implementations, material can be deposited onto the structures 160*a* and/or 160*b* via vapor deposition as an alternative to cleaning the structures 160*a* and/or 160*b*.

As an example, the vapor deposition assembly 112 can be configured to vapor deposit a silane coupling agent onto at least a portion of the structures 160*a* and/or 160*b*. A silane coupling agent can include, for example, an organo-functional group at one end each molecular, and a hydrolysable group at the other end of the molecule to form durable bonds with different types of organic and inorganic materials. In some implementations, the organo-functional group can include an acryloyl, which can crosslink into a patternable polymer material to form a particular optical pattern/shape. In some implementations, the organo-functional group can include a fluorinated chain, which can reduce the surface energy of the surface upon which it is deposited (e.g., to provide a non-boding release site that enables the cured polymer to be separated from the structures 160*a* and/or 160*b* after formation more easily).

In some implementations, vapor deposition can be carried out at low pressures (e.g., between 0.05 Torr to 200 Torr), whereby the coupling agent is delivered in vapor form with or without the use of an inert gas (e.g., $N_2$ gas). Further, the surface upon which material is deposited (e.g., a surface of the structures 160*a* and/or 160*b*) can include alkoxide (—O) groups and/or hydroxyl (—OH) groups to facilitate adhesion of the material. Further, carboxyl groups and/or carbonyl groups can also provide bonding sites with —O. In some implementations, a material having —O bonds, such glass (e.g., having abundant Si—O bonds), can be used to form Si—O—Si bonds with a siloxane-based crosslinking coupling agent.

In some implementations, vapor deposition can be used to form a layer having a thickness of approximately 0.5 nm to 0.7 nm. In some implementations, vapor deposition can be used to form a layer having a different thickness (e.g., greater than 0.7 nm, or less than 0.5 nm).

In some implementations, the system 100 can also include a liquid deposition assembly 118 configured to deposit additional material onto at least a portion of the structures 160*a* and/or 160*b* prior to dispensing the prepolymer material 164 onto the structures 160*a* and/or 160*b*. In some implementations, this is can facilitate a strong adhesive bond between the cured polymer and the structures 160*a* and/or 160*b*, which may be particularly beneficial if the cured polymer is intended to be permanently attached to the structures 160*a* and/or 160*b*. In some implementations, this is can reduce surface energy of the structures 160*a* and/or 160*b*, which may be particularly beneficial if the cured polymer is intended to be released from the structures 160*a* and/or 160*b* after formation.

In some implementations, material can be deposited onto the structures 160*a* and/or 160*b* via liquid deposition subsequent to cleaning the structures 160*a* and/or 160*b*. In some implementations, material can be deposited onto the structures 160*a* and/or 160*b* via liquid deposition as an alternative to cleaning the structures 160*a* and/or 160*b*.

As an example, the liquid deposition assembly 112 can be configured to liquid deposit a monomeric material having one or more functional groups onto at least a portion of the structures 160*a* and/or 160*b*. Example functional groups include alkyl, carboxyl, carbonyl, hydroxyl, and alkoxy, among others.

In some implementations, performing liquid deposition of a material can include ink jetting, spin coating, and/or spraying (e.g., atomizing) the material onto a surface, spin coating the material onto the surface. For instance, the liquid deposition assembly 118 can include an ink jet deposition system, a spin coater, and/or a sprayer (e.g., atomizer) to facilitate liquid deposition.

In some implementations, liquid deposition can be used to form a layer having a thickness of approximately 0.5 nm to 0.7 nm. In some implementations, liquid deposition can be used to form a layer having a different thickness (e.g., greater than 0.7 nm, or less than 0.5 nm).

The control module 150 is communicatively coupled to the control module 150, the cleaning assembly 110, the vapor deposition assembly 112, and dispenser assembly 114, the heating assembly 116, and the liquid deposition assembly 118, and is configured to control the operation of each of these components (e.g., either automatically, or based on input from a human operator). As an example, the control module 150 can be configured to selectively activate the cleaning assembly 110 to clean the structures 160*a* and/or 160*b*. As another example, the control module 150 can be configured to selectively activate the vapor deposition assembly 112 to deposit material onto the structures 160*a* and/or 160*b*. As another example, the control module 150 can be configured to selectively activate the liquid deposition assembly 118 to deposit material onto the structures 160*a* and/or 160*b*. As another example, the control module 150 can be configured to selectively activate the dispenser assembly 114 to dispense the prepolymer material 164 onto the structures 160*a* and/or 160*b*. As another example, the control module 150 can be configured to selectively activate the motor assembly 108 to move the actuable stages 102*a* and 102*b* relative one another (e.g., to control the gap volume 162). As another example, the control module 150 can be configured to selectively activate light sources 104*a* and 104*b* and/or the heating assembly 116 to cure the prepolymer material 164.

As described above, in some implementations, the system 100 can be configured to form one optical sub-component directly on another optical sub-component, such that there are no adhesive layers and/or any other intervening layers between them. A simplified example of this process is shown in FIGS. 2A-2D.

Figure 2A:
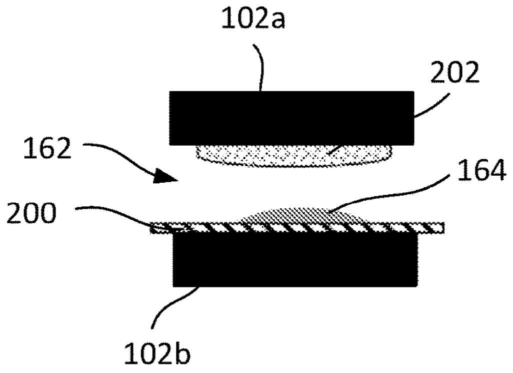
FIGS. 2A-2D are diagrams of an example process for forming an optical sub-component directly on another optical sub-component.

As shown in FIG. 2A, a first optical sub-component 200 can be secured to an actuable stage 102*b* (e.g., via a vacuum chuck and/or a mechanical chuck). Further, a metered amount of a prepolymer material 164 can be dispensed (e.g., via a dispenser assembly 114) onto the first optical sub-component 200 in a gap volume 162 between the first optical sub-component 200 and a mold structure 202. The mold structure 202 can be secured, for example, to an actuable stage 102*a* (e.g., via a vacuum chuck and/or a mechanical chuck).

In some implementations, the first optical sub-component 200 and/or the mold structure 202 can be cleaned (e.g., via a cleaning assembly 110), prior to dispensing the prepolymer material 164.

In some implementations, one or more materials can be vapor deposited onto the first optical sub-component 200 (e.g., via a vapor deposition assembly 112), prior to dispensing the prepolymer material 164. In some implementations, the first optical sub-component 200 can be cleaned, and after cleaning, one or more materials can be subsequently vapor deposited onto the first optical sub-component 200. In some implementations, one or more materials can be vapor deposited onto the first optical sub-component 200 without first cleaning the first optical sub-component 200.

In some implementations, one or more materials can be liquid deposited onto the first optical sub-component 200 (e.g., via a liquid deposition assembly 118), prior to dispensing the prepolymer material 164. In some implementations, the first optical sub-component 200 can be cleaned, and after cleaning, one or more materials can be subsequently liquid deposited onto the first optical sub-component 200. In some implementations, one or more materials can be liquid deposited onto the first optical sub-component 200 without first cleaning the first optical sub-component 200.

Figure 2B:
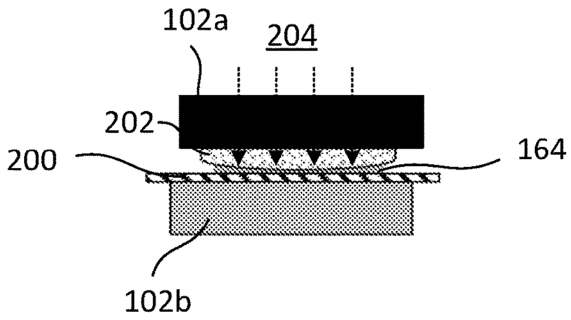

Further, as shown in FIG. 2B, the mold structure 202 and the first optical sub-component 200 are moved towards each other (e.g., by moving the actuable stages 102*a* and/or 102*b* towards one other), such that the mold structure 202 contacts the prepolymer material 164. The prepolymer material 164 is then cured by directing light and/or heat 204 onto the prepolymer material 164 (e.g., via light sources 104*a* and 104*b* and/or a heating assembly 116).

Figure 2C:
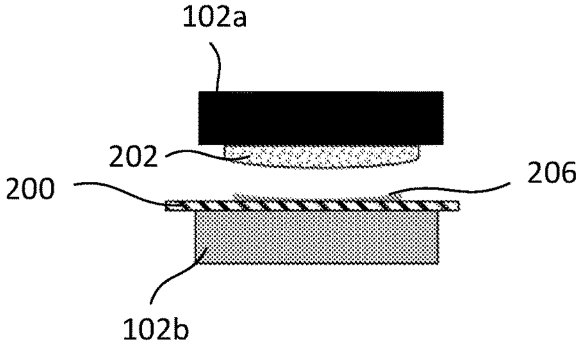

As shown in FIG. 2C, once the prepolymer material 164 has cured into a cured polymer product (forming a second optical sub-component 206), the mold structure 202 and the first optical sub-component 200 are moved away from each other (e.g., by moving the actuable stages 102*a* and/or 102*b* away from one another). In this example, this causes the second optical sub-component 206 to release from the mold structure 202, while remaining adhered to the first optical-subcomponent 200.

Figure 2D:
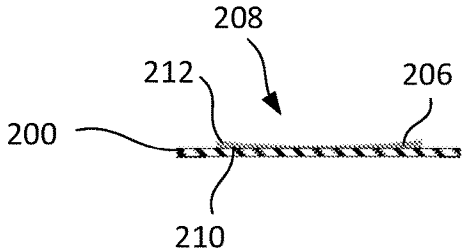

Further, as shown in FIG. 2D, the first optical sub-component 200 and the second optical sub-component 206 are removed from the actuable stage 102*b* as a single item 208 (e.g., an integrated optical component having two optical sub-components).

In this example, the prepolymer material 164 is cast between a planar surface of the first optical sub-component 200 and a convex surface of the mold structure 202, resulting in a second optical sub-component 206 having a planar surface 210, and a concave surface 212 opposite the planar surface 210.

Differently shaped mold structures can be used to form optical sub-components having different configurations. To illustrate, another simplified example process is shown in FIGS. 3A-3D.

Figure 3A:
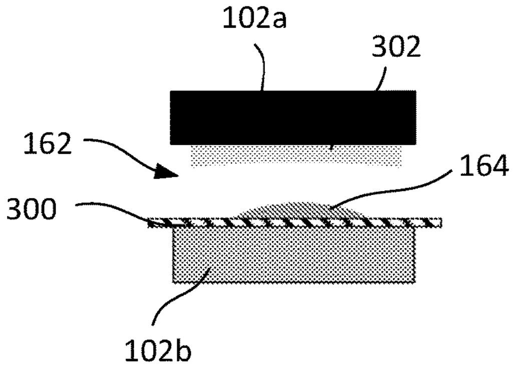
FIGS. 3A-3D are diagrams of another example process for forming an optical sub-component directly on another optical sub-component.

As shown in FIG. 3A, a first optical sub-component 300 can be secured to an actuable stage 102*b* (e.g., via a vacuum chuck and/or a mechanical chuck). Further, a metered amount of a prepolymer material 164 can be dispensed (e.g., via a dispenser assembly 114) onto the first optical sub-component 300 in a gap volume 162 between the first optical sub-component 300 and a mold structure 302. The mold structure 302 can be secured, for example, to an actuable stage 102*a* (e.g., via a vacuum chuck and/or a mechanical chuck).

In some implementations, the first optical sub-component 300 and/or the mold structure 302 can be cleaned (e.g., via a cleaning assembly 110), prior to dispensing the prepolymer material 164.

In some implementations, one or more materials can be vapor deposited onto the first optical sub-component 300 (e.g., via a vapor deposition assembly 112), prior to dispensing the prepolymer material 164. In some implementations, the first optical sub-component 300 can be cleaned, and after cleaning, one or more materials can be subsequently vapor deposited onto the first optical sub-component 300. In some implementations, one or more materials can be vapor deposited onto the first optical sub-component 300 without first cleaning the first optical sub-component 300.

In some implementations, one or more materials can be liquid deposited onto the first optical sub-component 300 (e.g., via a liquid deposition assembly 118), prior to dispensing the prepolymer material 164. In some implementations, the first optical sub-component 300 can be cleaned, and after cleaning, one or more materials can be subsequently liquid deposited onto the first optical sub-component 300. In some implementations, one or more materials can be liquid deposited onto the first optical sub-component 300 without first cleaning the first optical sub-component 300.

Figure 3B:
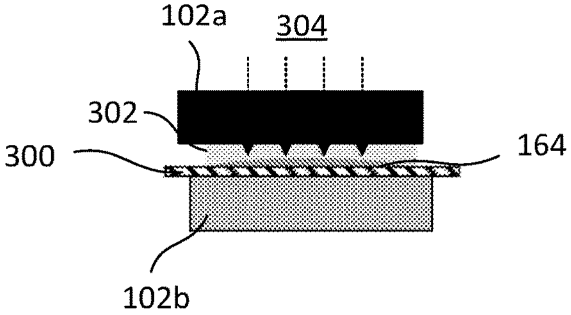

Further, as shown in FIG. 3B, the mold structure 302 and the first optical sub-component 300 are moved towards each other (e.g., by moving the actuable stages 102*a* and/or 102*b* towards one other), such that the mold structure 302 contacts the prepolymer material 164. The prepolymer material 164 is then cured by directing light and/or heat 304 onto the prepolymer material 164 (e.g., via light sources 104*a* and 104*b* and/or a heating assembly 116).

Figure 3C:
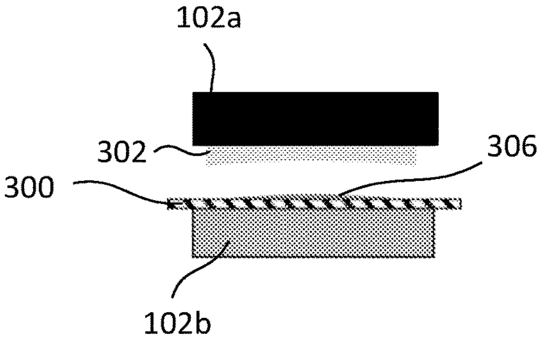

As shown in FIG. 3C, once the prepolymer material 164 has cured into a cured polymer product (forming a second optical sub-component 306), the mold structure 302 and the first optical sub-component 300 are moved away from each other (e.g., by moving the actuable stages 102*a* and/or 102*b* away from one another). In this example, this causes the second optical sub-component 306 to release from the mold structure 302, while remaining adhered to the first optical-subcomponent 300.

Figure 3D:
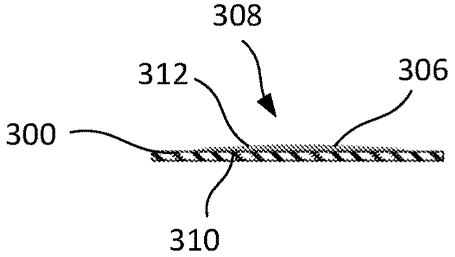

Further, as shown in FIG. 3D, the first optical sub-component 300 and the second optical sub-component 306 are removed from the actuable stage 102*b* as a single item 308 (e.g., an integrated optical component having two optical sub-components).

In this example, the prepolymer material 164 is cast between a planar surface of the first optical sub-component 300 and a concave surface of the mold structure 302, resulting in a second optical-component 306 having a planar surface 310, and a convex surface 312 opposite the planar surface 310.

In the example processes shown in FIGS. 2A-2D and 3A-3D, an optical sub-component is formed on top of another optical sub-component (e.g., by depositing prepolymer material on a top surface of an optical sub-component, and molding and curing the prepolymer material). However, in some implementations, an optical sub-component is formed below another optical sub-component (e.g., by depositing prepolymer material on a bottom surface of an optical sub-component, and molding and curing the prepolymer material). To illustrate, another simplified example process is shown in FIGS. 4A-4D.

Figure 4A:
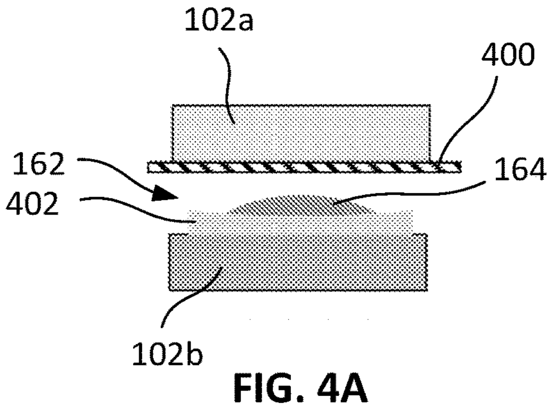
FIGS. 4A-4D are diagrams of another example process for forming an optical sub-component directly on another optical sub-component.

As shown in FIG. 4A, a mold structure 402 can be secured to an actuable stage 102*b* (e.g., via a vacuum chuck and/or a mechanical chuck). Further, a metered amount of a prepolymer material 164 can be dispensed (e.g., via a dispenser assembly 114) onto the mold structure 402 in a gap volume 162 between the mold structure 402 and a first optical sub-component 400. The first optical sub-component 400 can be secured, for example, to an actuable stage 102*a* (e.g., via a vacuum chuck and/or a mechanical chuck).

In some implementations, the first optical sub-component 400 and/or the mold structure 402 can be cleaned (e.g., via a cleaning assembly 110), prior to dispensing the prepolymer material 164.

In some implementations, one or more materials can be vapor deposited onto the first optical sub-component 400 (e.g., via a vapor deposition assembly 112), prior to dispensing the prepolymer material 164. In some implementations, the first optical sub-component 200 can be cleaned, and after cleaning, one or more materials can be subsequently vapor deposited onto the first optical sub-component 400. In some implementations, one or more materials can be vapor deposited onto the first optical sub-component 400 without first cleaning the first optical sub-component 400.

In some implementations, one or more materials can be liquid deposited onto the first optical sub-component 400 (e.g., via a liquid deposition assembly 118), prior to dispensing the prepolymer material 164. In some implementations, the first optical sub-component 400 can be cleaned, and after cleaning, one or more materials can be subsequently liquid deposited onto the first optical sub-component 400. In some implementations, one or more materials can be liquid deposited onto the first optical sub-component 400 without first cleaning the first optical sub-component 400.

Figure 4B:
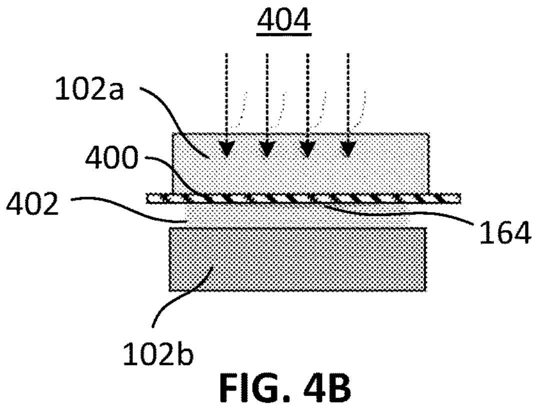

Further, as shown in FIG. 4B, the mold structure 402 and the first optical sub-component 400 are moved towards each other (e.g., by moving the actuable stages 102*a* and/or 102*b* towards one other), such that the first optical sub-component 400 contacts the prepolymer material 164. The prepolymer material 164 is then cured by directing light and/or heat 404 onto the prepolymer material 164 (e.g., via light sources 104*a* and 104*b* and/or a heating assembly 116).

Figure 4C:
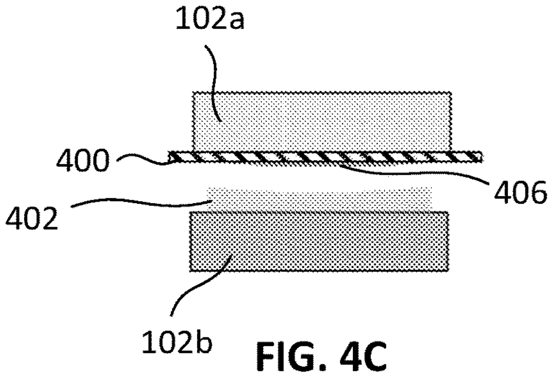

As shown in FIG. 4C, once the prepolymer material 164 has cured into a cured polymer product (forming a second optical sub-component 406), the mold structure 402 and the first optical sub-component 400 are moved away from each other (e.g., by moving the actuable stages 102*a* and/or 102*b* away from one another). In this example, this causes the second optical sub-component 406 to release from the mold structure 402, while remaining adhered to the first optical-subcomponent 400.

Figure 4D:
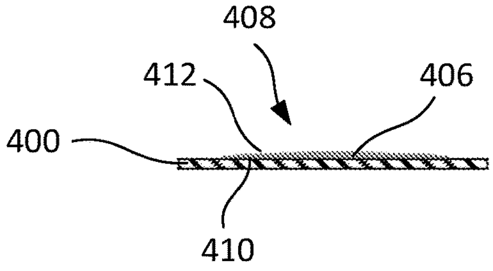

Further, as shown in FIG. 4D, the first optical sub-component 400 and the second optical sub-component 406 are removed from the actuable stage 102*b* as a single item 308 (e.g., an integrated optical component having two optical sub-components).

In this example, the prepolymer material 164 is cast between a planar surface of the first optical sub-component 400 and a concave surface of the mold structure 402, resulting in a second optical-component 406 having a planar surface 410, and a convex surface 412 opposite the planar surface 410. However, in practice, differently shaped optical sub-components can be formed by the casting the prepolymer material 164 between differently shaped mold structures and/or other optical sub-components.

In the examples shown in FIGS. 2A-2D, 3A-3D, and 4A-4D, an optical sub-component is formed directly on a planar surface of another optical sub-component. However, in some implementations, an optical sub-component can be formed directly on a curved surface of another optical sub-component. In some implementations, this may be referred to as "back filling" an optical sub-component. To illustrate, another simplified example process is shown in FIGS. 5A-5C.

Figure 5A:
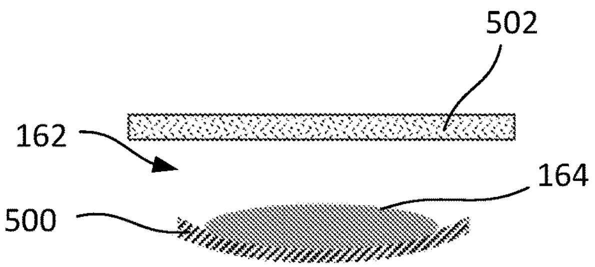
FIGS. 5A-5C are diagrams of another example process for forming an optical sub-component directly on another optical sub-component.
Figure 5B:
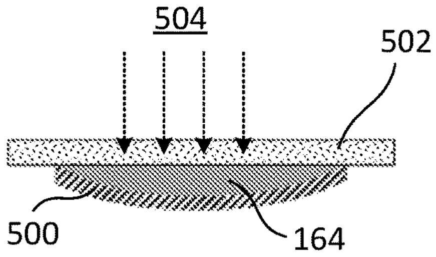
Figure 5C:
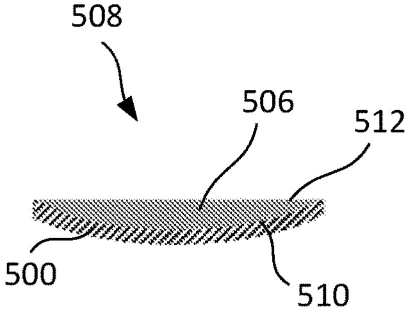

As shown in FIG. 5A, a metered amount of a prepolymer material 164 can be dispensed (e.g., via a dispenser assembly 114) onto the first optical sub-component 500 in a gap volume 162 between the first optical sub-component 500 and a mold structure 502. The first optical sub-component 500 and the mold structure 502 can be secured, for example, to respective actuable stages 102*a* and 102*b* (e.g., via vacuum chucks and/or mechanical chucks). For ease of illustration, the actuable stages 102*a* and 102*b* are not shown in FIGS. 5A-5C.

In some implementations, the first optical sub-component 500 and/or the mold structure 502 can be cleaned (e.g., via a cleaning assembly 110), prior to dispensing the prepolymer material 164.

In some implementations, one or more materials can be vapor deposited onto the first optical sub-component 500 (e.g., via a vapor deposition assembly 112), prior to dispensing the prepolymer material 164. In some implementations, the first optical sub-component 500 can be cleaned, and after cleaning, one or more materials can be subsequently vapor deposited onto the first optical sub-component 500. In some implementations, one or more materials can be vapor deposited onto the first optical sub-component 500 without first cleaning the first optical sub-component 500.

In some implementations, one or more materials can be liquid deposited onto the first optical sub-component 500 (e.g., via a liquid deposition assembly 118), prior to dispensing the prepolymer material 164. In some implementations, the first optical sub-component 500 can be cleaned, and after cleaning, one or more materials can be subsequently liquid deposited onto the first optical sub-component 500. In some implementations, one or more materials can be liquid deposited onto the first optical sub-component 500 without first cleaning the first optical sub-component 500. Further, as shown in FIG. 5B, the first optical sub-component 500 and the mold structure 502 are moved towards each other (e.g., by moving the actuable stages 102*a* and/or 102*b* towards one other), such that the mold structure 502 contacts the prepolymer material 164. The prepolymer material 164 is then cured by directing light and/or heat 504 onto the prepolymer material 164 (e.g., via light sources 104*a* and 104*b* and/or a heating assembly 116).

Once the prepolymer material 164 has cured into a cured polymer product (forming a second optical sub-component 506), the first optical sub-component 500 and the mold structure 502 are moved away from each other (e.g., by moving the actuable stages 102*a* and/or 102*b* away from one another). As shown in FIG. 5C, in this example, this causes the second optical sub-component 506 to release from the mold structure 502, while remaining adhered to the first optical-subcomponent 500. The first optical sub-component 500 and the second optical sub-component 506 can be removed from the system 100 as a single item 508 (e.g., an integrated optical component having two optical sub-components).

In this example, the prepolymer material 164 is cast between a concave surface of the first optical sub-component 500 and a planar surface of the mold structure 502, resulting in a second optical sub-component 506 having a convex surface 510, and a planar surface 512 opposite the convex surface 510.

As described above, differently shaped mold structures can be used to form optical sub-components having different configurations. To illustrate, another simplified example process is shown in FIGS. 6A-6C.

Figure 6A:
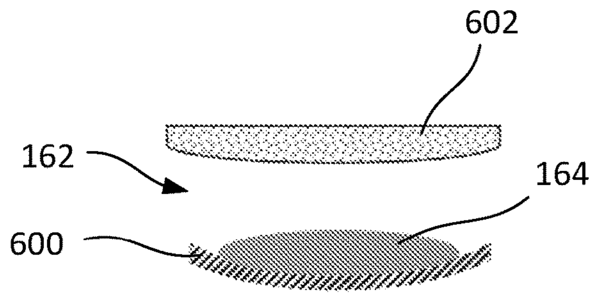
FIGS. 6A-6C are diagrams of another example process for forming an optical sub-component directly on another optical sub-component.
Figure 6B:
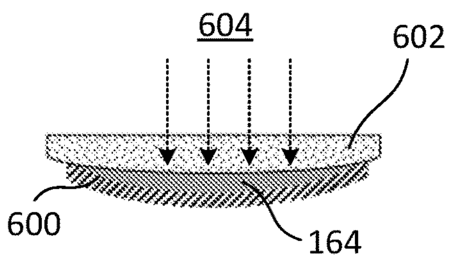
Figure 6C:
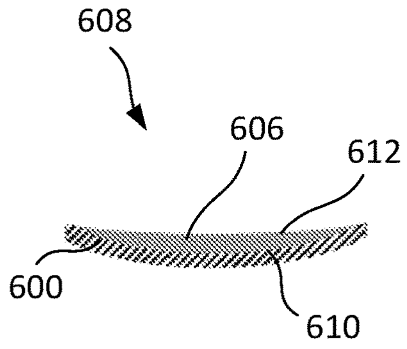

As shown in FIG. 6A, a metered amount of a prepolymer material 164 can be dispensed (e.g., via a dispenser assembly 114) onto the first optical sub-component 600 in a gap volume 162 between the first optical sub-component 600 and a mold structure 602. The first optical sub-component 600 and the mold structure 602 can be secured, for example, to respective actuable stages 102*a* and 102*b* (e.g., via vacuum chucks and/or mechanical chucks). For ease of illustration, the actuable stages 102*a* and 102*b* are not shown in FIGS. 6A-6C.

In some implementations, the first optical sub-component 600 and/or the mold structure 602 can be cleaned (e.g., via a cleaning assembly 110), prior to dispensing the prepolymer material 164.

In some implementations, one or more materials can be vapor deposited onto the first optical sub-component 600 (e.g., via a vapor deposition assembly 112), prior to dispensing the prepolymer material 164. In some implementations, the first optical sub-component 600 can be cleaned, and after cleaning, one or more materials can be subsequently vapor deposited onto the first optical sub-component 600. In some implementations, one or more materials can be vapor deposited onto the first optical sub-component 600 without first cleaning the first optical sub-component 600.

In some implementations, one or more materials can be liquid deposited onto the first optical sub-component 600 (e.g., via a liquid deposition assembly 118), prior to dispensing the prepolymer material 164. In some implementations, the first optical sub-component 600 can be cleaned, and after cleaning, one or more materials can be subsequently liquid deposited onto the first optical sub-component 600. In some implementations, one or more materials can be liquid deposited onto the first optical sub-component 600 without first cleaning the first optical sub-component 600.

Further, as shown in FIG. 6B, the first optical sub-component 600 and the mold structure 602 are moved towards each other (e.g., by moving the actuable stages 102*a* and/or 102*b* towards one other), such that the mold structure 602 contacts the prepolymer material 164. The prepolymer material 164 is then cured by directing light and/or heat 604 onto the prepolymer material 164 (e.g., via light sources 104*a* and 104*b* and/or a heating assembly 116).

Once the prepolymer material 164 has cured into a cured polymer product (forming a second optical sub-component 606), the first optical sub-component 600 and the mold structure 602 are moved away from each other (e.g., by moving the actuable stages 102*a* and/or 102*b* away from one another). As shown in FIG. 6C, in this example, this causes the second optical sub-component 606 to release from the mold structure 602, while remaining adhered to the first optical-subcomponent 600. The first optical sub-component 600 and the second optical sub-component 606 can be removed from the system 100 as a single item 608 (e.g., an integrated optical component having two optical sub-components).

In this example, the prepolymer material 164 is cast between a concave surface of the first optical sub-component 600 and a convex surface of the mold structure 602, resulting in a second optical sub-component 606 having a convex surface 610, and a concave surface 612 opposite the convex surface 610.

As described above, in some implementations, the system 100 can be configured to form optical sub-components individually. A simplified example of this process is shown in FIGS. 7A-7C.

Figure 7A:
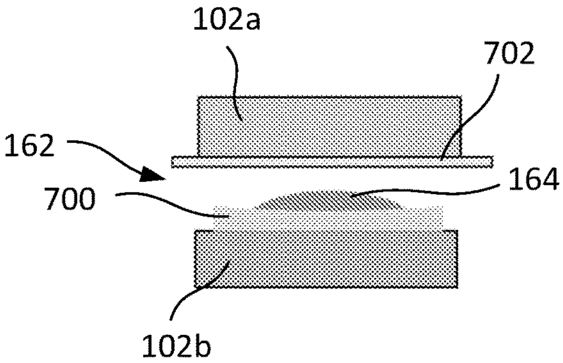
FIGS. 7A-7C are diagrams of an example process for forming optical sub-components individually.

As shown in FIG. 7A, a first mold structure 700 can be secured to an actuable stage 102*b* (e.g., via a vacuum chuck and/or a mechanical chuck). Further, a metered amount of a prepolymer material 164 can be dispensed (e.g., via a dispenser assembly 114) onto the first mold structure 700 in a gap volume 162 between the first mold structure 700 and a second mold structure 702. The second mold structure 702 can be secured, for example, to an actuable stage 102_a_ (e.g., via a vacuum chuck and/or a mechanical chuck).

Figure 7B:
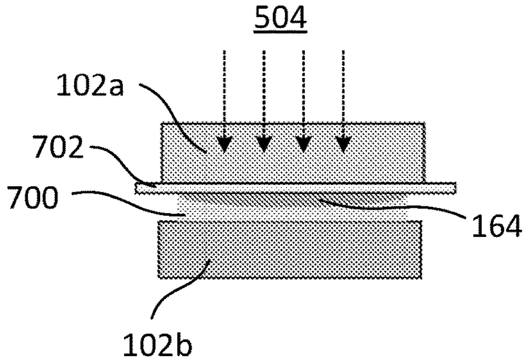
Figure 7C:
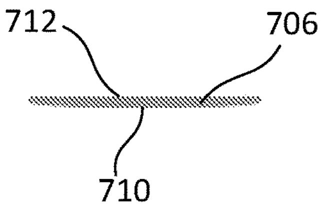

Further, as shown in FIG. 7B, the first mold structure 700 and the second mold structure 702 are moved towards each other (e.g., by moving the actuable stages 102_a_ and/or 102_b_ towards one other), such that the second mold structure 502 contacts the prepolymer material 164. The prepolymer material 164 is then cured by directing light and/or heat 704 onto the prepolymer material 164 (e.g., via light sources 104_a_ and 104_b_ and/or a heating assembly 116).

Once the prepolymer material 164 has cured into a cured polymer product (forming an optical sub-component 706), the first mold structure 700 and the second mold structure 702 are moved away from each other (e.g., by moving the actuable stages 102_a_ and/or 102_b_ away from one another). The optical sub-component 706 is then extracted from the system 100.

As shown in FIG. 7C, in this example, the prepolymer material 164 is cast between a concave surface of the first mold structure 700 and a planar surface of the second mold structure 702, resulting in an optical-component 706 having a convex surface 510, and a planar surface 712 opposite the convex surface 710. However, in practice, differently shaped optical sub-components can be formed by the casting the prepolymer material 164 between differently shaped mold structures.

In some implementations, the optical sub-component 706 can be cleaned (e.g., via a cleaning assembly 110) after formation.

In some implementations, one or more materials can be vapor deposited onto the optical sub-component 706 (e.g., via a vapor deposition assembly 112) after formation. In some implementations, the optical sub-component 706 can be cleaned, and after cleaning, one or more materials can be subsequently vapor deposited onto the optical sub-component 706. In some implementations, one or more materials can be vapor deposited onto the optical sub-component 706 without first cleaning the optical sub-component 706.

In some implementations, one or more materials can be liquid deposited onto the first optical sub-component 700 (e.g., via a liquid deposition assembly 118), prior to dispensing the prepolymer material 164. In some implementations, the first optical sub-component 700 can be cleaned, and after cleaning, one or more materials can be subsequently liquid deposited onto the first optical sub-component 700. In some implementations, one or more materials can be liquid deposited onto the first optical sub-component 700 without first cleaning the first optical sub-component 700.

Further, as described above, individually formed optical sub-components can be secured to one another (e.g., via one or more adhesive layers) to form an optical assembly. A simplified example of this process is shown in FIGS. 8A-8C.

Figure 8A:
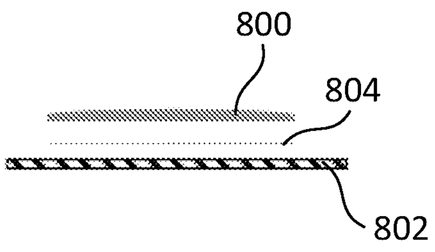
FIGS. 8A-8C are diagrams of an example process for securing optical sub-components to one another.
Figure 8B:
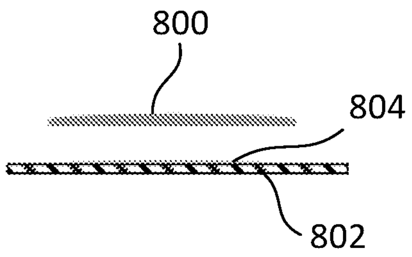

As shown in FIG. 8A, a first optical sub-component 800 and a second optical sub-component 802 are formed (e.g., using the process shown in FIGS. 7A-7C).

Further, an adhesive layer 804 is positioned between the first optical sub-component 800 and the second optical sub-component 802. As an example, as shown in FIG. 8B, an adhesive layer 804 can be applied to the second optical sub-component 802. In some implementations, the adhesive layer 804 can include one or more dry adhesive agents (e.g., to facilitate adhesion between the first optical sub-component 800 and the second optical sub-component 802 via dry lamination). In some implementations, the adhesive layer 804 can include one or more liquid adhesive agents (e.g., to facilitate adhesion between the first optical sub-component 800 and the second optical sub-component 802 via wet lamination). In some implementations, the adhesive layer 804 can include substances such as optically clear adhesive, pressure sensitive adhesives, and UV and/or heat curable polymers (e.g., polymers based on acrylate and/or epoxy), among others.

Figure 8C:
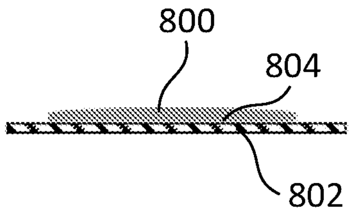

Further, as shown in FIG. 8C, the first optical sub-component 800 is placed on top of the adhesive layer 804, such that the first optical sub-component 800 and the second optical sub-component 802 are secured to one another.

Figure 9:
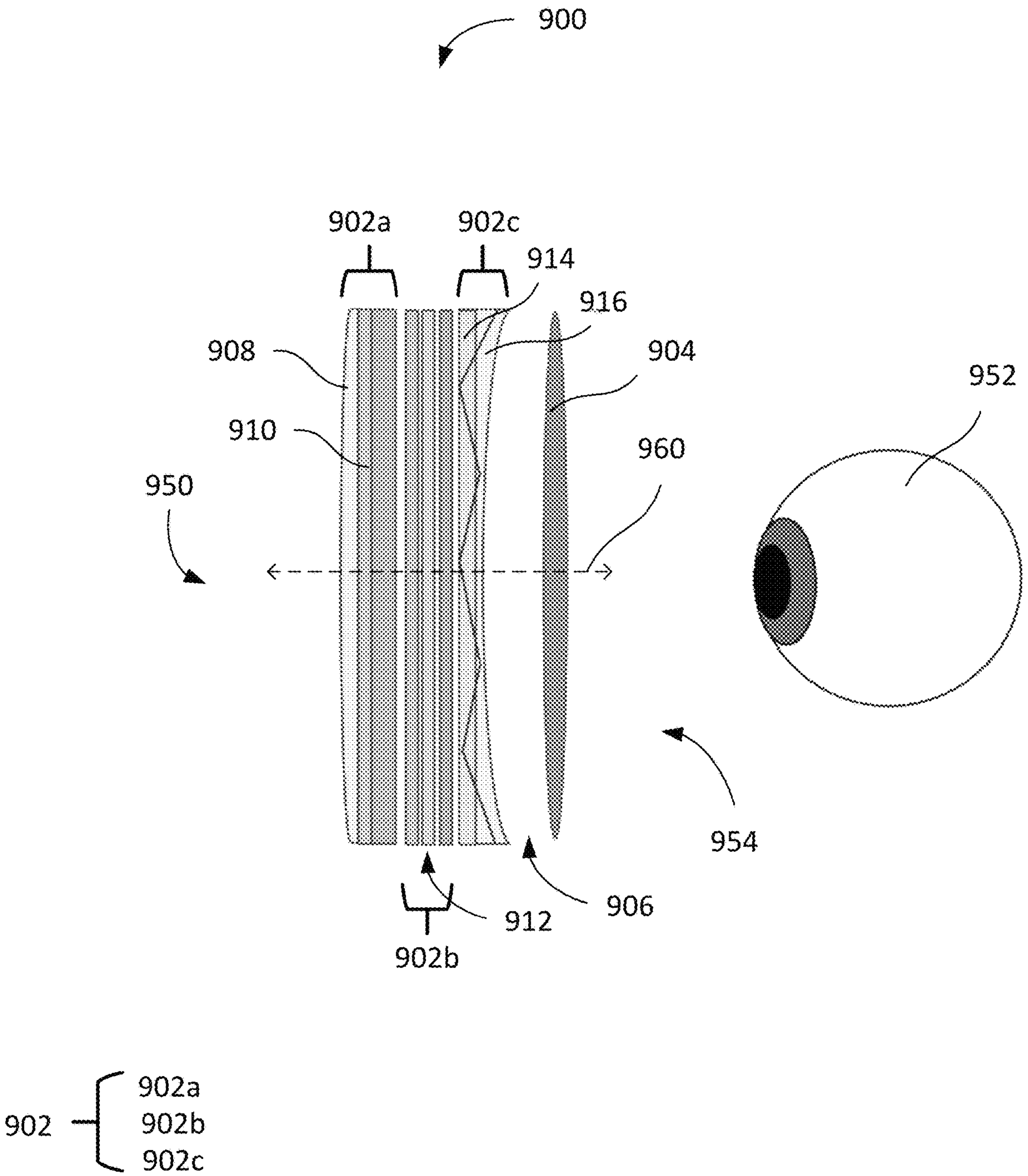
FIG. 9 is a diagram of an example optical assembly.

FIG. 9 shows an example optical assembly 900 that can be produced, at least in part, using one or more of the systems and/or techniques described herein. In some implementations, the optical assembly 900 can form at least a portion of a viewing optics assembly (VOA) for an optical imaging system, such as a head mounted display device.

In general, the optical assembly 900 includes several optical elements that are stacked on one another along an optical axis 960 (e.g., forming an "optical stack"). In this example, the optical assembly 900 includes an integrated optical component 902 including several sets of optical elements 902_a_-902_c_. Further, the optical assembly 900 includes an optical lens 904 separated from the sets of optical elements 902_a_-902_c_ by an air gap 906.

In this example, the first set of optical elements 902_a_ includes an optical lens 908 (e.g., an ophthalmic lens) and a dimmer 910. During operation of the optical assembly 900, the optical lens 908 receives light from a world side 950 of the optical assembly 900 (e.g., the side of the optical assembly 900 facing away from the user 952 when a device having the optical assembly 900 is worn by the user), refracts the light (e.g., at the boundaries of the optical lens 908), and transmits at least some of the refracted light to the dimmer 910.

Further, the dimmer 910 receives light transmitted by the optical lens 908, and selectively attenuates the light (e.g., to control and/or modulate ambient light that is transmitted to a user 952). In some implementations, the dimmer 910 can include a segmented dimmer assembly configured to selectively attenuate light with respect to several spatial regions. For example, a segmented dimmer assembly can include an array of dimming elements arranged in a particular pattern (e.g., a two-dimensional grid perpendicular to the optical axis 960), and each of the dimming elements can be selectively operated to attenuate and/or transmit light that impinges upon it. In some implementations, the dimmer 910 can be used to regulate ambient light and maintain acceptable contrast levels between ambient light and projected imagery in augmented reality applications. In some implementations, the dimmer 910 can include one or more electrical traces (e.g., interconnecting the array of dimming elements to one or more other electrical components).

Light from the dimmer 910 is provided to the second set of optical elements 902_b_. In this example, the second set of optical elements 902_b_ includes several waveguides 912, each of which guides light from a light source and projects at least a portion of the guided light towards the user side 956 of the optical assembly 900 (e.g., the side of the optical assembly 900 away towards the user 952 when a device having the optical assembly 900 is worn by the user). In some implementations, each of the waveguides 912 can be layered one atop another, with waveguide 912 having a different pattern and each waveguide 912 projecting a different depth layer of a volumetric image. Thus, the waveguides 912 can collectively present a volumetric image to the user across three-dimensions. In some implementations, each of the waveguides 912 can be configured to transmit light having a particular color (e.g., red, green, or blue), such that the waveguides 912 collectively transmit images to the user 952 according to a range of colors in the visible spectrum. In some implementations, the waveguide 912 may also be referred to as illumination layers.

Light from the first set of optical elements 902*a* (e.g., ambient light) and light from the second set of optical elements 902*b* (e.g., light corresponding images to be projected to the user) is provided to the third set of optical elements 902*c*. In this example, the third set of optical elements 902*c* includes an eye tracking assembly 914 and an optical lens 916 (e.g., an ophthalmic lens).

The eye tracking assembly 914 is configured to track the movement, position, and/or orientation of the user's eye, and generate sensor data regarding that movement, position, and/or orientation. In some implementations, the generated sensor data can indicative of a user's gaze, and can be used to modify the images that are projected by the user to account for the gaze. As an example, the sensor data can be provided to an image processing system that controls the projection of images to the user. The image processing system can determine the user's gaze based on the sensor data, and selectively adjust the projected image in response to changes in the user's gaze (e.g., by instructing the light sources that are coupled to the waveguides 912 to provide light according to different spatial and/or temporal patterns). In some implementations, the eye tracking assembly 914 can include one or more infrared sensors. In some implementations, the eye tracking assembly 914 can include one or more electrical traces (e.g., interconnecting the sensors to one or more other electrical components).

Further, the optical lens 916 receives light from the first set of optical elements 902*a* and light from the second set of optical elements 902*b*, refracts the light (e.g., by the boundaries of the optical lens 916), and transmit at least some of the refracted light towards the user side 954 of the optical assembly 900. In some implements, the optical lens 916 can be used to focus at least some of the light onto an eye of the user 952, such that the user can perceive images in her field of view.

In the example shown in FIG. 9, the optical assembly 900 also includes an optical lens 904 separated from the sets of optical element 902*a*-902*c* by an air gap 906. The optical lens 904 is configured to account for refractive errors in the user's eye, such as myopia, hypermetropia, astigmatism, and/or presbyopia. As an example, the optical lens 904 can be configured to receive light from the third set of optical elements 902*c*, refract the light (e.g., at the boundaries of the optical lens 904), and transmits at least some of the refracted light toward the user side 954 of the optical assembly 900. The optical lens 904 can have different optical powers to account for variations in the refractive error in the user's eye.

Some or all of the components of the optical assembly 900 can be produced, at least in part, using one or more of the systems and/or techniques described herein. For example, the optical lens 908 can be directly formed on the dimmer 910 by depositing a prepolymer material directly onto the dimmer 910, shaping the prepolymer material with a mold, and curing the prepolymer material. As another example, the optical lens 908 can be formed separately from the dimmer 910, and adhered to the dimmer 910.

As another example, the optical lens 916 can be directly formed on the eye tracking assembly 914 by depositing a prepolymer material directly onto the eye tracking assembly 914, shaping the prepolymer material with a mold, and curing the prepolymer material. As another example, the optical lens 916 can be formed separately from the eye tracking assembly 914, and adhered to the eye tracking assembly 914.

As described above, in some implementations, the system and techniques described herein can be used to form a lens (e.g., an ophthalmic lens) on another optical component, such as a Fresnel lens on a plano surface. Various types of lenses can be formed in this manner.

In some implementations, the lens can have a positive optical power (e.g., an optical power in a range from +1 D to +1.5 D). In some implementations, the lens can have a negative optical power (e.g., an optical power in a range from −1 D to −1.5 D).

As an example, a lens can have a radius of curvature between 400 mm and 450 mm. Further, the lens can have an aperture size of between 25 mm and 50 mm. Further still, the lens can have a refractive index between 1.5 and 1.6.

As another example, a lens can have a radius of curvature greater than 200 mm. Further, the lens can have an aperture size greater than 5 mm. Further still, the lens can have a refractive index between 1.5 and 1.75.

In some implementations, the characteristics of a lens can be selected based on the formula:

$$\text{Power} = \frac{n_l - n_m}{n_m} \times \left(\frac{1}{R_{l1}} - \frac{1}{R_{l2}}\right), \quad \text{(Eq. 1)}$$

where Power is the optical power of a lens l, $n_l$ is the refractive index of the lens l, $n_m$ is the refractive index of a lens m, $R_{l1}$ and $R_{l2}$ are the radii of curvature of the two sides of the lens l. For plano-type lens, $R_{l1}$ or $R_{l2}$ becomes infinity.

In some implementations, the lens can have a positive optical power in a range from +0.5 D to +4 D. In some implementations, the lens can have a negative optical power in a range from −0.5 D to −4 D).

As an example, a lens can have a radius of curvature between 150 mm and 1000 mm. Further, the lens can have an aperture size of between 25 mm and 95 mm (which may be particularly suitable for use in glasses or safety goggles, such may have a wrap angle of 5° to 10°). Further, the lens can have a minimum focal length of 25 cm (e.g., a focal length between 25 cm and 2 m). Further, the lens can have a refractive index between 1.5 and 1.6.

In some implementations, one or more coatings and/or films to be applied to some or all of the components of an optical assembly. For instance, an optical assembly can include components (e.g., lens or other optically transmission components) having surfaces that are exposed to air (e.g., rather than directly abutting another component). One or more coatings and/or films can be applied to at least one of those surfaces, such as to protect those surfaces and/or improve the optical characteristics of the optical assembly. In some implementations, coatings and/or films can be applied to a component of an optical assembly by lamination (e.g., dry lamination and/or wet lamination).

As an example, an anti-reflective coating can be applied to at least one of the exposed surfaces of the components of an optical assembly. In some implementations, an anti-reflective coating can include alternating high index films (e.g., composed at least in part of $TiO_2$ and/or $ZrO_2$) and low index films (e.g., composed at least in part of $SiO_2$ and/or $MgF_2$).

As another example, a protective coating can be applied to at least one of the exposed surfaces of the components of an optical assembly. In some implementations, a protective coating can include one or more hard inorganic transparent films (e.g., composed at least in part of $SiO_2$) to provide scratch resistance for the optical assembly.

Although example components are described above, these are merely illustrative examples. In practice, any component of an optical assembly can be directly formed on any other component of the optical assembly (e.g., any of the components of the optical assembly 900) and/or adhered to any other component of the optical assembly, in accordance with the systems and techniques described herein.

In some implementations, the techniques described herein can be performed to form photochromic optical components and/or electrochromic optical components. These optical components can be beneficial, for example, in controlling the amount of light that is transmitted by a VOA. For example, a VOA having optical components (e.g., dimmers) that are implemented using photochromic optical components and/or electrochromic optical components may have higher light transmissivity and/or reduced thickness compared to VOAs that do not have such optical components (e.g., a VOA having active polarization-based dimmers instead). Nevertheless, in some implementations, VOA can include active polarization-based optical components, either instead or in addition to optical components implemented using photochromic optical components and/or electrochromic optical components.

In general, photochromic optical components (e.g., lenses, waveguides, films, etc.) are optical components that display changes in color or opacity in response to exposure to activing light (e.g., light having a sufficiently high frequency, such as ultraviolet light). For example, upon exposure to activating light, a photochromic optical component may become more opaque, such that light passing through the optical component is attenuated to a greater degree and/or blocked entirely. In the absence of activing light, the photochromic optical component may become less opaque, such that the light passing through the optical component is attenuated to a lesser degree (or is transmitted entirely). In some implementations, photochromic optical components can be configured to selectively attenuate particular wavelengths of light in response to activing light, while substantially transmitting other wavelengths of light (e.g., to selectively alter the color spectra of the transmitted light). In some implementations, photochromic optical components can be formed from materials such as silver halides (e.g., AgCl), diarylethene, dithienylethene, naphthopyrans, and/or oxazines, among other materials.

Further, photochromic materials can be categorized as either T-type or P-type. In general, T-type photochromic materials can undergo thermally reversible photochromism (e.g., T-type photochromic materials may return to their original state upon cessation of the activing light). In contrast, P-type photochromic materials can undergo photochemically reversible photochromism (e.g., P-type photochromic materials may return to their original state upon application of de-activing light having a different wavelength than that of the activing light).

In some implementations, photochromic optical components can be used to control the transmission of light through a VOA, depending on whether the VOA is operated in an environment having lower intensity ambient light (e.g., indoors). For example, a photochromic optical component can be configured such that it is highly transmissive in an environment having low intensity ambient light (e.g., indoors), while having reduced light transmissivity in an environment having high intensity ambient light (e.g., outdoors). This can be beneficial, for example, in presenting content to a user according to a consistent image quality and constrast under various operating conditions.

In some implementations, photochromic optical components can be formed by using one or more photochromic dyes or pigments. For example, when forming an optical component (e.g., a lenses), one or more photochromic dyes or pigments can be added to the precursor materials used to form the optical component in order to impart photochromic properties to the resulting optical component. As another example, one or more photochromic dyes or pigments can be used to form optical layers that are applied on or between other optical components.

Example photochromic dyes or pigments are produced by Yamada Chemical Co. Ltd. (Kyoto, Japan). For instance, example T-type photochromic dyes or pigments include: TPC-0021, TPC-0024, TPC-0033, TPC-0054, TPC-0073, TPC-0062, and TPC-0144. Further, example T-type photochromic dyes or pigments include: DAE-0001, DAE-0004, DAE-0012, DAE-0018, DAE-0068, DAE-0097, DAE-0133, and DAE-0159.

In some implementations, an optical assembly can include one or more layers of photochromic material molded to, adhered to, or otherwise secured to another optical component. For example, referring to FIG. 9, one or more layers of photochromic material can be molded to, adhered to, or otherwise secured to the world side and/or the user side of the optical lens 908. As another example, one or more layers of photochromic material can be molded to, adhered to, or otherwise secured to the world side and/or the user side of the second set of optical elements 902*b* (e.g., to the world side of the waveguide 912 nearest the world side and/or to the user side of the waveguide 912 nearest the user). As another example, one or more layers of photochromic material can be molded to, adhered to, or otherwise secured to the world side and/or the user side of the third set of optical elements 902*b* (e.g., to the world side of the eye tracking assembly 914 and/or to the user side of the optical lens 916).

In some implementations, an optical assembly can include one or more optical components formed using photochromic materials (e.g., one or more photochromic dyes or pigments). For example, referring to FIG. 9, the optical lens 908 can be formed using photochromic materials. As another example, one or more of the components of the second set of optical elements 902*b* (e.g., one or more of the waveguide 912) can be formed using photochromic materials. As another example, the optical lens 916 can be formed using photochromic materials.

As described above, in some implementations, an optical assembly can include one or more layers of photochromic material that are molded to, adhered to, or otherwise secured to another optical component.

For example, referring to FIGS. 2A-5C, one or more of the optical sub-components 200, 300, 400, or 500 can be an optically transmissive substrate composed, at least in part, of a photochromic material. Further, according to the techniques shown in FIGS. 2A-5C, another optical sub-component (e.g., a lens) can be formed on the optical sub-components 200, 300, 400, or 500.

As another example, referring to FIGS. 8A-8C, the optical sub-component 802 can be an optically transmissive substrate composed, at least in part, of a photochromic material.

As another example, one or more of the optical sub-components 200, 300, 400, 500, or 802 can be an optically transmissive substrate that is laminated, adhered to, or otherwise secured to a layer of photochromic material.

As described above, in some implementations, an optical assembly can include one or more optical components formed using photochromic materials. For instance, as described above (e.g., with reference to FIGS. 1-8C), an optical sub-component can be formed from a curable prepolymer material. The prepolymer material can include photochromic materials, such as one or more photochromic dyes or pigments mixed into the prepolymer material (e.g., as described above). In turn, the prepolymer material can be cured into an optical sub-component (e.g., a lens, waveguide, layer, etc.), and laminated to, adhered to, or otherwise secured to another optical sub-component.

In some implementations, the techniques described herein also can be performed to form electrochromic optical components. In general, electrochromic optical components (e.g., lenses, waveguides, films, etc.) are optical components that display changes in color or opacity in response to electrical stimulus. For example, upon receiving an electrical stimulus, an electrochromic optical component may become more opaque, such that light passing through the optical component is attenuated to a greater degree and/or blocked entirely. In the absence of electrical stimulus, the electrochromic optical component may become less opaque, such that the light passing through the optical component is attenuated to a lesser degree (or is transmitted entirely). In some implementations, electrochromic optical components can be configured to selectively attenuate particular wavelengths of light in response to electrical stimulus, while substantially transmitting other wavelengths of light (e.g., to selectively alter the color spectra of the transmitted light).

In some implementations, electrochromic optical components can be formed using transparent conductive electrodes (e.g., indium tin oxide (ITO), conductive polymers, metal nanowire films, etc.), ion storage layers, and/or ion transport layers that perform reduction-oxidation (redox) chemistry on transition metal oxide materials (e.g., $IrO_2$, $V_2O_5$, NiO, $WO_3$, $MoO_3$, etc. As an example, in one oxidation state these metal oxides may be transparent, and in another they may have significant visible absorption. An electrical stimulation can be selectively applied to (or removed from) the metal oxides (e.g., via the conductive electrodes, ion storage layers, and/or ion transport layers) to selectively switch the metal oxides between the two oxidation states.

In some implementations, electrochromic optical components can be formed using on copolymer or mixed oxide systems. For example, a color neutral modulation can be achieved using microelectromechanical systems (MEMS) based activate layers, including both MEMS-based mirrors and "microblinds" provided on transparent conductive oxides, such as ITO. In some implementations, the microblinds can be thin partially transparent metal strips that are rolled up and fully transparent in an "off" state (e.g., when no electrical stimulus is applied to the transparent conductive oxides), and unroll and at least partially block light when in an "on" state (e.g., when electrical stimulus is applied to the transparent conductive oxides).

This configuration may be particularly advantageous in implementing a segmented dimmer for a VOA, due to a rapid switching time between off and on states (and vice versa) and due to the color neutral modulation of light. For example, a segmented dimmer can include an array of electrochromic optical components arranged in a particular pattern (e.g., a two-dimensional grid perpendicular to the optical axis of the VOA). Each of the electrochromic optical components can be selectively switched to modulate light along different respective portions of the user's field of view.

Figure 10:
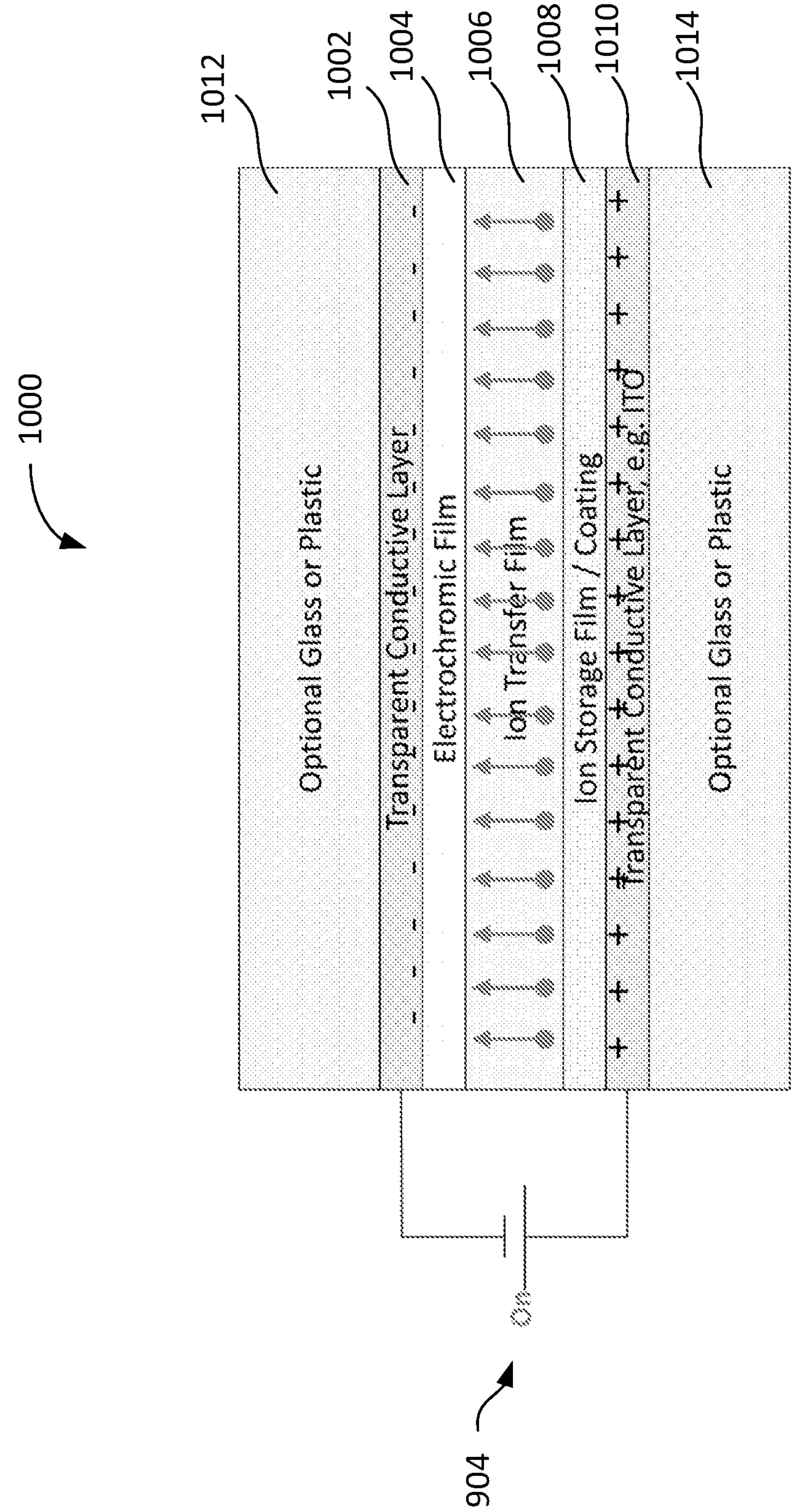
FIG. 10 is a diagram of an example electrochromic optical component.

FIG. 10 shows an example electrochromic optical component 1000. The electrochromic optical component 1000 includes a first transparent conductive layer 1002, an electrochromic film 1004, an ion transfer film 1006, an ion storage film or coating 1008, and a second transparent conductive layer 1010 arranged in a stack. The electrochromic optical component 1000 can also include glass or plastic layers to protect the electrochromic optical component 1000. For example, electrochromic optical component 1000 can include a glass or plastic layer 1012 on top of the first transparent conductive layer 1002 and/or a glass or plastic layer 1014 below the second conductive layer 1010 at least partially enclose the electrochromic optical component 1000.

The electrochromic optical component 1000 also includes a voltage source 1016 electrically coupled to the first transparent conductive layer 1002 and the second transparent conductive layer 1010. The source 1016 can be selectively activated or deactivated to change the opacity of the electrochromic optical component 1000.

For example, the voltage source 1016 can apply positive voltage of the second transparent conductive layer 1010 and a negative voltage to the first transparent conductive layer 1002. In response, positively charged electrical ions from the ion storage film or coating 1008 migrate away from the second transparent conductive layer 1010, through the ion transfer film, and into the electrochromic film 1004. The flow of electrical ions electrically stimulates the electrochromic film 1004 and causes the electrochromic film 1004 to change in opacity (e.g., increase in opacity). When the voltage source is switched off or its polarity reversed, the positively charged electrical ions migrate back through the ion transfer film 1006 and into the ion storage film or coating 1008. The reverse flow of electrical ions ceases the electrical stimulation the electrochromic film 1004, and causes the electrochromic film 1004 to change reverse its change in opacity (e.g., decrease in opacity).

In some implementations, first transparent conductive layer 1002 and the second transparent conductive layer 1010 can be formed, at least in part, of ITO and/or Poly(3,4-ethylenedioxythiophene) (PEDOT). In some implementations, the conductive layers can be sandwiched between substrates, such as substrates composed at least in part of a rigid or flexible inorganic material (e.g., soda lime, borosilicate, flint glass, fused silica, etc.) and/or an organic material (e.g., polycarbonate (PC), polyethylene terephthalate (PET), tantalum carbide (TAC), etc.).

In some implementations, the electrochromic film can be formed, at least in part, of a transition metal, such as $IrO_2$, $V_2O_5$, NiO, $WO_3$, $MoO_3$, etc. In some implementations, the electrochromic film can include MEMS based activate layers, such as MEMS-based mirrors and microblinds provided on transparent conductive oxides (e.g., ITO).

In some implementations, the electrochromic film can be formed, at least in part, of a polymer that changes color when switched between oxidation and reduction states. As an example, the electrochromic film can be formed, at least in part, of electrochemically active conjugated polymers such as poly(3,4-ethylenedioxythiophene-didodecyloxybenzene) (PEB), viologens, polypyrrole, polythiophene, polyaniline and their derivatives, metal polymers, and/or metal phthalocyanines. In some implemtations, other inorganic materials (e.g., hexacyanometallates) also can be used in addition to or instead of metal oxides.

In some implementations, the ion transfer film 1006 can be formed, least in part, of a solid or liquid electrolyte material. As an example, the ion transfer film 1006 can include gel electrolytes, such as Poly(vinylidene fluoride-co-hexafluoropropylene)/Lithium bis(trifluoromethanesulfonyl)imide (PVDF-co-HFP/LiTFSI).

In some implementations, the ion storage film or coating 1008 can be formed, least in part, by dry deposition of NiO of a different porosity, $CeO_2$, and/or $V_2O_5$.

In some implementations, an optical assembly can include one or more electrochromic devices (e.g., at least a portion of the electrochromic optical device 1000) molded to, adhered to, or otherwise secured to another optical component. For example, referring to FIG. 9, one or more electrochromic devices can be molded to, adhered to, or otherwise secured to the world side and/or the user side of the optical lens 908. As another example, one or more electrochromic devices can be molded to, adhered to, or otherwise secured to the world side and/or the user side of the second set of optical elements 902*b* (e.g., to the world side of the waveguide 912 nearest the world side and/or to the user side of the waveguide 912 nearest the user). As another example, one or more electrochromic devices can be molded to, adhered to, or otherwise secured to the world side and/or the user side of the third set of optical elements 902*b* (e.g., to the world side of the eye tracking assembly 914 and/or to the user side of the optical lens 916).

In some implementations, an optical assembly can include one or more optical components formed using electrochromic materials (e.g., one or more electrochromic dyes or pigments). For example, referring to FIG. 9, the optical lens 908 can be formed using electrochromic materials. As another example, one or more of the components of the second set of optical elements 902*b* (e.g., one or more of the waveguide 912) can be formed using electrochromic materials. As another example, the optical lens 916 can be formed using electrochromic materials.

As described above, in some implementations, an optical assembly can include one or more layers of electrochromic material molded to, adhered to, or otherwise secured to another optical component.

For example, referring to FIGS. 2A-5C, one or more of the optical sub-components 200, 300, 400, or 500 can be an optically transmissive substrate composed, at least in part, of an electrochromic material. Further, according to the techniques shown in FIGS. 2A-5C, another optical sub-component (e.g., a lens) can be formed on optical sub-components 200, 300, 400, or 500.

As another example, referring to FIGS. 8A-8C, the optical sub-component 802 can be an optically transmissive substrate composed, at least in part, of an electrochromic material.

As another example, one or more of the optical sub-components 200, 300, 400, 500, or 802 can be an optically transmissive substrate that is laminated to, adhered to, or otherwise secured to a layer of electrochromic material.

Figure 11A:
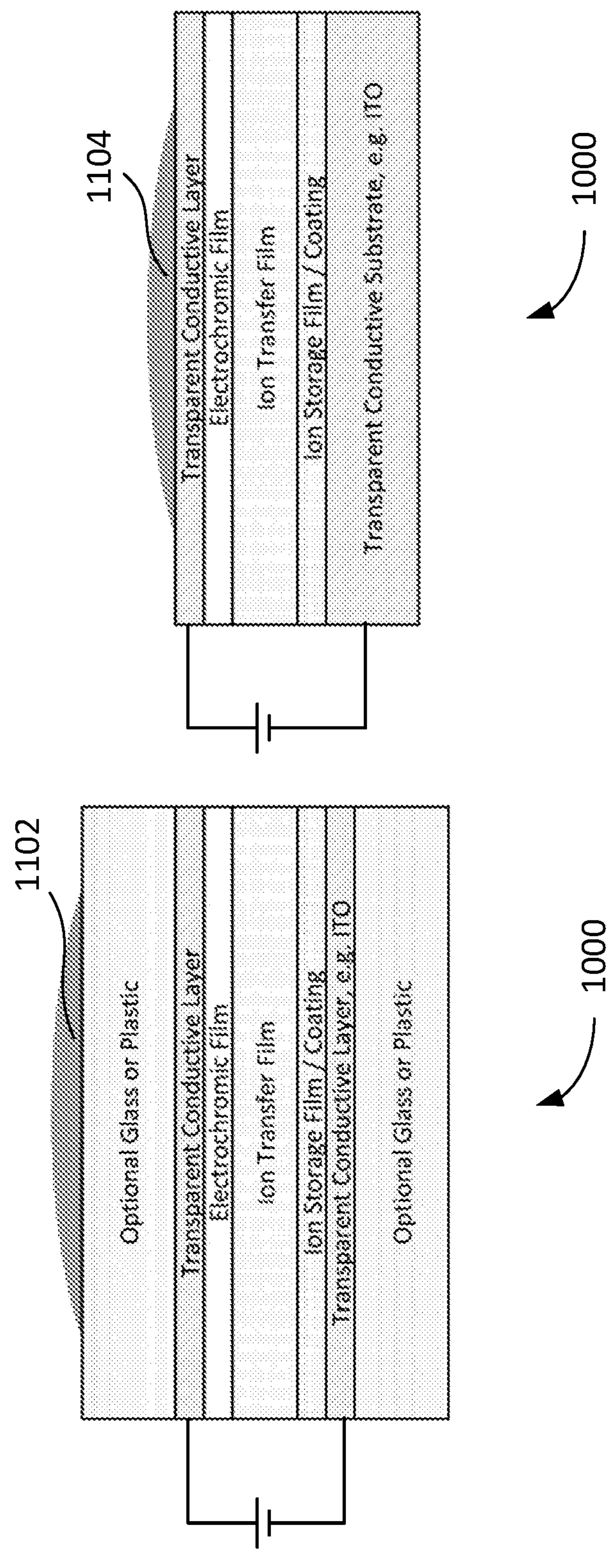

For instance, as shown in FIG. 11A, an electrochromic optical component 1000 having outer glass or plastic layers can function as a substrate, and an optical sub-component 1102 can be formed on or otherwise secured to a surface of the electrochromic optical component 1000 (e.g., atop the upper glass or plastic layer or below the bottom glass or plastic layer). A voltage source can be electrically coupled to the transparent conductive substrates to selectively control the opacity of the electrochromic optical component 1000.

As another example, an electrochromic optical component 1000 without outer glass or plastic layers can function as a substrate, and an optical sub-component 1104 can be formed on or otherwise secured to a surface of the electrochromic optical component 1000 (e.g., atop the upper transparent conductive layer and/or below the bottom transparent conductive layer). A voltage source can be electrically coupled to the transparent conductive substrates to selectively control the opacity of the electrochromic optical component 1000.

As described above, in some implementations, an optical assembly can include one or more optical components formed using electrochromic materials. For instance, as described above (e.g., with reference to FIGS. 1-8C), an optical sub-component can be formed from a curable prepolymer material. The prepolymer material can include electrochromic materials, such as one or more electrochromic dyes or pigments mixed into the prepolymer material (e.g., as described above). In turn, the prepolymer material can be cured into an optical sub-component (e.g., a lens, waveguide, layer, etc.), and laminated to, adhered to, or otherwise secured to another optical sub-component.

Figure 11B:
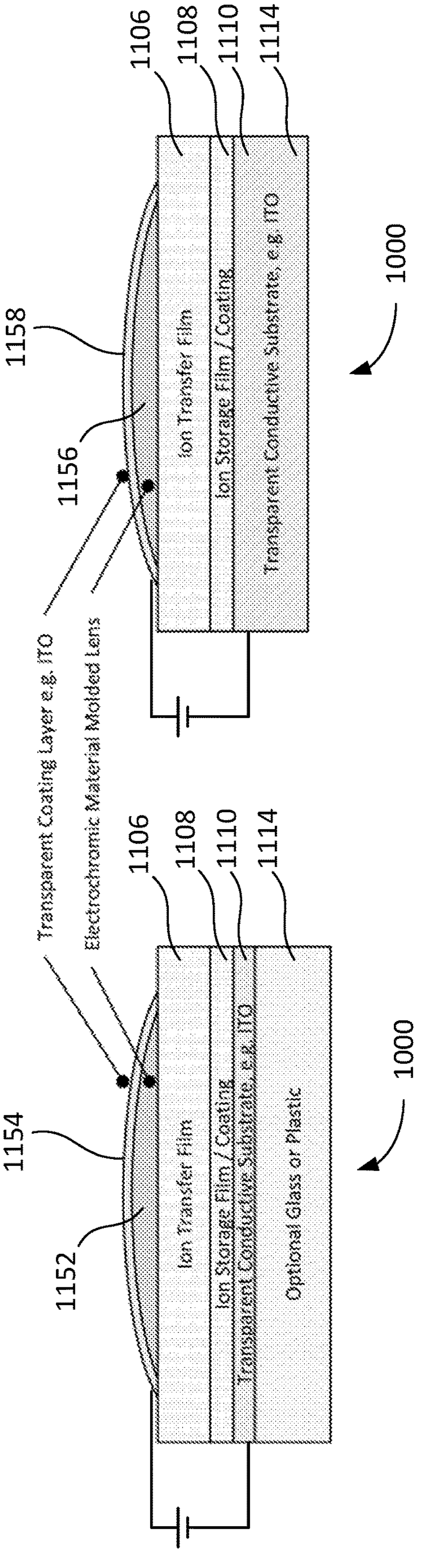

For instance, as shown in FIG. 11B, an electrochromic optical component 1000 having a lower outer glass or plastic layer 1014, a lower transparent conductive substrate 1010, an ion storage film or coating 1008, and an ion transfer film 1006 can function as a substrate. Further, an optical sub-component 1152 can be formed on or otherwise secured to a surface of the electrochromic optical component 1000 (e.g., atop the ion transfer film), and a transparent coating layer 1154 (e.g., composed at least in part of ITO) can be applied atop the optical sub-component 1152. Further, a voltage source can be electrically coupled to the transparent conductive substrate 1010 and the transparent coating layer 1154 to selectively control the opacity of the electrochromic optical component 1000.

As another example, an electrochromic optical component 1000 having a lower transparent conductive substrate 1010, an ion storage film or coating 1008, and an ion transfer film 1006 can function as a substrate. Further, an optical sub-component 1156 can be formed on or otherwise secured to a surface of the electrochromic optical component 1000 (e.g., atop the ion transfer film 1106), and a transparent coating layer 1158 (e.g., composed at least in part of ITO) can be applied atop the optical sub-component 1156. Further, a voltage source can be electrically coupled to the transparent conductive substrate and the transparent coating layer to selectively control the opacity of the electrochromic optical component 1000.

Figure 12:
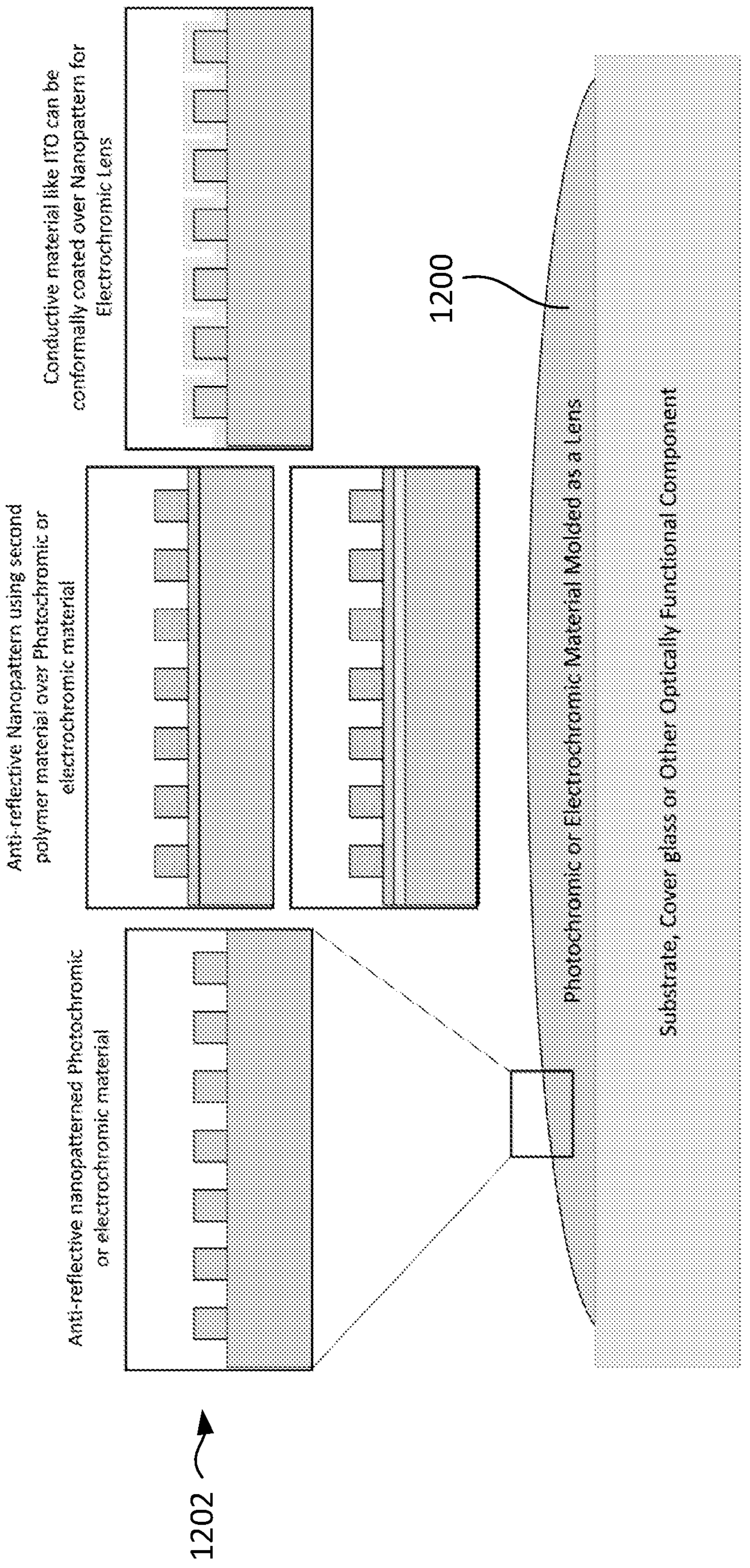
FIG. 12 is a diagram of an example optical component having a nanopattern along at least a portion of its exterior surface.

In some implementations, an optical component (e.g., a photochromic and/or electrochromic optical component) can have an anti-reflective pattern formed along at least a portion of its exterior surface. For example, referring to FIG. 12, an optical component 1200 of a VOA (e.g., a photochromic and/or electrochromic lens) can include a nanopattern 1202 having a series of repeated gratings formed along at least a portion of its exterior surface. The gratings can be configured to increase the light transmitted through the VOA, and/or to reduce surface reflection of world side light or projected light through the VOA toward the user or back into the waveguide outcoupling elements of the VOA.

In some implementations, the nanopattern 1202 can be formed from the same material as the optical component 1200. In some implementations, the nanopattern 1202 can be formed from a material different from the optical component 1200 (e.g., a material that is inkjet and imprinted over the curvature of the optical component 1200).

In some implementations, the optical component 1200 can be an electrochromic lens formed from an electrochromic composite material, and the nanopattern 1202 can be coated with a conductive material, such as ITO (e.g., using physical vapor deposition (PVD) sputter) to complete to facilitate the flow of ions (e.g., as described above). In some implementations, a coating of conductive material can be formed from hard coasting materials (e.g., $SiO_2$), blank anti-reflection coatings (e.g., $MgF_2$, $SiO_2$, $TiO_2$,), and/or any combinations thereof.

Example Processes

Figure 13A:
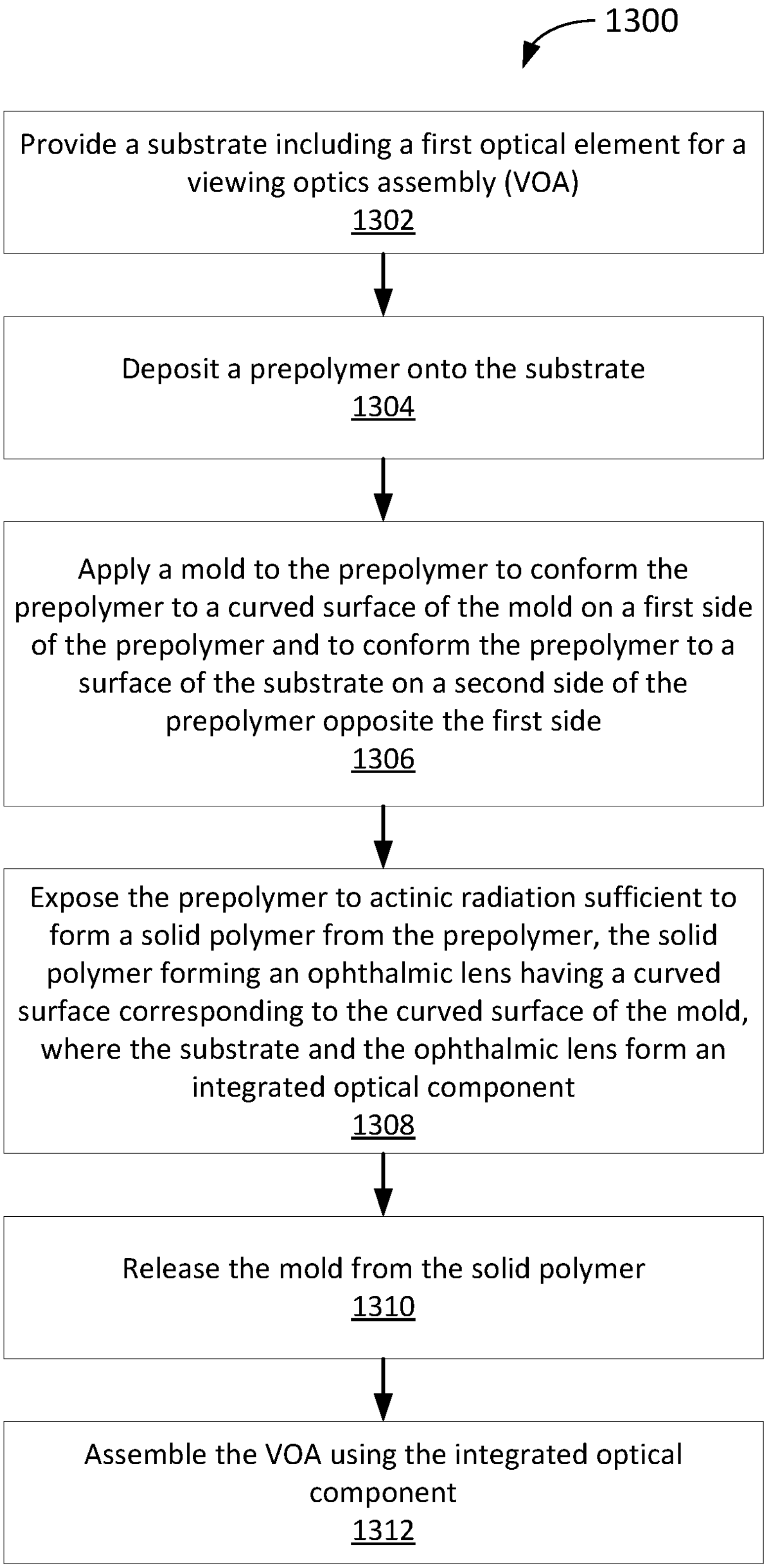
FIGS. 13A and 13B are flow chart diagrams of example processes for forming a viewing optics assembly.

FIG. 13A shows an example process 1300 for forming a viewing optics assembly (VOA). The process 1300 can be performed, for example, at least part using the system 100 and/or the techniques shown in FIGS. 2A-8C). In some cases, the process 1300 can be used to produce VOAs suitable for use in optical applications (e.g., as a part of an optical imaging system, such as a heat mounted display device). In some implementations, the process 1300 can be performed to form at least a portion of the devices shown in FIGS. 9-12.

In the process 1300, a substrate including a first optical element for a viewing optical assembly (VOA) is provided (block 1302).

In general, the first optical element can be any component that is to be included as a portion of the VOA (e.g., any layer or other component that is to be included in an optical stack). In some implementations, the first optical element can include a segmented dimmer configured to selectively modulate an intensity of light transmitted by the VOA (e.g., a dimmer 910, as described with reference to FIG. 9). In some implementations, the first optical element can include an illumination layer configured to emit light along an optical axis of the VOA (e.g., a waveguide 912, as described with reference to FIG. 9). In some implementations, the first optical element can include at least one layer that is part of an eye tracking assembly configured to track a motion of a user's eye while the head mounted display is worn by the user (e.g., an eye tracking assembly 914, as described with reference to FIG. 9). In some implementations, the first optical element can include one or more lenses (e.g., ophthalmic lenses).

Further, a prepolymer is deposited onto the substrate (block 1304). As an example a prepolymer can be deposited onto the substrate using a dispenser assembly 114, as described with reference to FIG. 1.

In some implementations, the prepolymer can include an epoxy vinyl ester and/or a cyclic aliphatic epoxy. In some implementations, the prepolymer can also include a photoinitiator or a co-reactant for promoting a curing of the prepolymer.

Further, a mold is applied to the prepolymer to conform the prepolymer to a curved surface of the mold on a first side of the prepolymer and to conform the prepolymer to a surface of the substrate on a second side of the prepolymer opposite the first side (block 1306). Example molds are described with reference to FIGS. 1-8C.

Further, while the mold is applied to the prepolymer, the prepolymer is exposed to actinic radiation sufficient to form a solid polymer from the prepolymer (block 1308). The solid polymer forms an ophthalmic lens having a curved surface corresponding to the curved surface of the mold. The substrate and the ophthalmic lens form an integrated optical component. As an example, actinic radiation can be emitted onto the prepolymer using the light sources 104*a* and/or 104*b* described with reference to FIG. 1.

In some implementations, the prepolymer can be exposed to actinic radiation having a wavelength of 365 nm and an intensity between 0.1 J/cm$^2$ and 10 J/cm$^2$. In some implementations, the prepolymer can be exposed to actinic radiation having a wavelength between 310 nm and 410 nm, and an intensity between 0.1 J/cm$^2$ and 100 J/cm$^2$. Other wavelengths and/or intensities are also possible, depending on the implementation.

In some implementations, heat can also be applied to the prepolymer (e.g., concurrent with exposing the prepolymer to actinic radiation). In some implementations, the prepolymer can be heated a temperature between 40 °C and 120 °C. Other temperatures are also possible, depending on the implementation.

Further, the mold is released from the solid polymer (block 1310). As an example, the mold can be withdrawn from the solid polymer, and the integrated optical component (including the substrate and the ophthalmic lens formed by the solid polymer) can be extracted from between the mold and the substrate.

Further, the VOA is assembled using the integrated optical component (block 1312). As an example, the integrated optical component can be included as at least a portion of an optical stack (e.g., a stack of optical layers and/or other components).

Various types of ophthalmic lens can be formed using the process 1300.

As an example, the surface of the substrate can be planar. Further, the ophthalmic lens can include a planar surface corresponding to the planar surface of the substrate, where the planar surface of the ophthalmic lens is opposite the curved surface of the ophthalmic lens.

As another example, the surface of the substrate can be curved. Further, the ophthalmic lens can include a second curved surface corresponding to the curved surface of the substrate, where the second curved surface of the ophthalmic lens is opposite the curved surface of the ophthalmic lens.

As another example, the ophthalmic lens can include a Fresnel lens on a plano surface. In some implementations, the Fresnel lens can have a lens ridge height between 25 μm and 1000 μm.

As another example, the ophthalmic lens can have a positive optical power (e.g., an optical power in a range from +1 D to +1.5 D, or in a range from +0.5 D to +4 D). In some implementations, the ophthalmic lens can have a negative optical power (e.g., an optical power in a range from −1 D to −1.5 D, or in a range from −0.5 D to −4 D).

As another example, the ophthalmic lens can have a radius of curvature between 400 mm and 450 mm. Further, the ophthalmic lens can have an aperture size of between 25 mm and 50 mm. Further still, the ophthalmic lens can have a refractive index between 1.5 and 1.6.

As another example, the ophthalmic lens can have a radius of curvature greater than 200 mm. Further, the ophthalmic lens can have an aperture size greater than 5 mm. Further still, the ophthalmic lens can have a refractive index between 1.5 and 1.75.

As another example, the ophthalmic lens can have a radius of curvature between 350 mm and 400 mm.

As another example, the ophthalmic lens can have a radius of curvature between 450 mm and 500 mm.

As another example, the ophthalmic lens can have an aperture size of between 25 mm and 95 mm.

As another example, the ophthalmic lens can have a radius of curvature between 150 mm and 1000 mm. Further, the ophthalmic lens can have a minimum focal length of 25 cm. In some implementations, the ophthalmic lens can have a focal length between 25 cm and 2 m.

In practice, an ophthalmic lens can have other dimensions and properties, depending on the implementation.

In some implementations, prior to depositing the prepolymer onto the substrate, the surface of the substrate can be cleaned (e.g., using a cleaning assembly 110, as described with reference to FIG. 1). Cleaning the substrate can include applying an aqueous acidic solution and an aqueous basic solution to the surface of the substrate, applying an organic solvent to the surface of the substrate, sonicating the surface of the substrate, exposing the surface of the substrate to a plasma, and/or exposing the surface of the substrate to ultraviolet light and/or ozone.

In some implementations, prior to depositing the prepolymer onto the substrate, a material can be deposited onto the surface of the substrate using vapor deposition (e.g., using a vapor deposition assembly 112, as described with reference to FIG. 1). In some implementations, the material can include a silane coupling agent.

In some implementations, prior to depositing the prepolymer onto the substrate, a material can be deposited onto the surface of the substrate using liquid deposition. The material can include a monomer having one or more functional groups (e.g., alkyl, carboxyl, carbonyl, hydroxyl, and/or alkoxy). In some implementations, the material cam be deposited onto the surface of the substrate by ink jetting, spin coating, and/or spraying (e.g., atomizing) the material onto the surface.

In some implementations, an anti-reflecting coating and/or a protective coating can be applied to a surface of the integrated optical component, such as a surface of the integrated optical component that is exposed to air.

In some implementations, at least one of the prepolymer or the substrate can include a photochromic material.

In some implementations, at least one of the prepolymer or the substrate can include an electrochromic material.

Figure 13B:
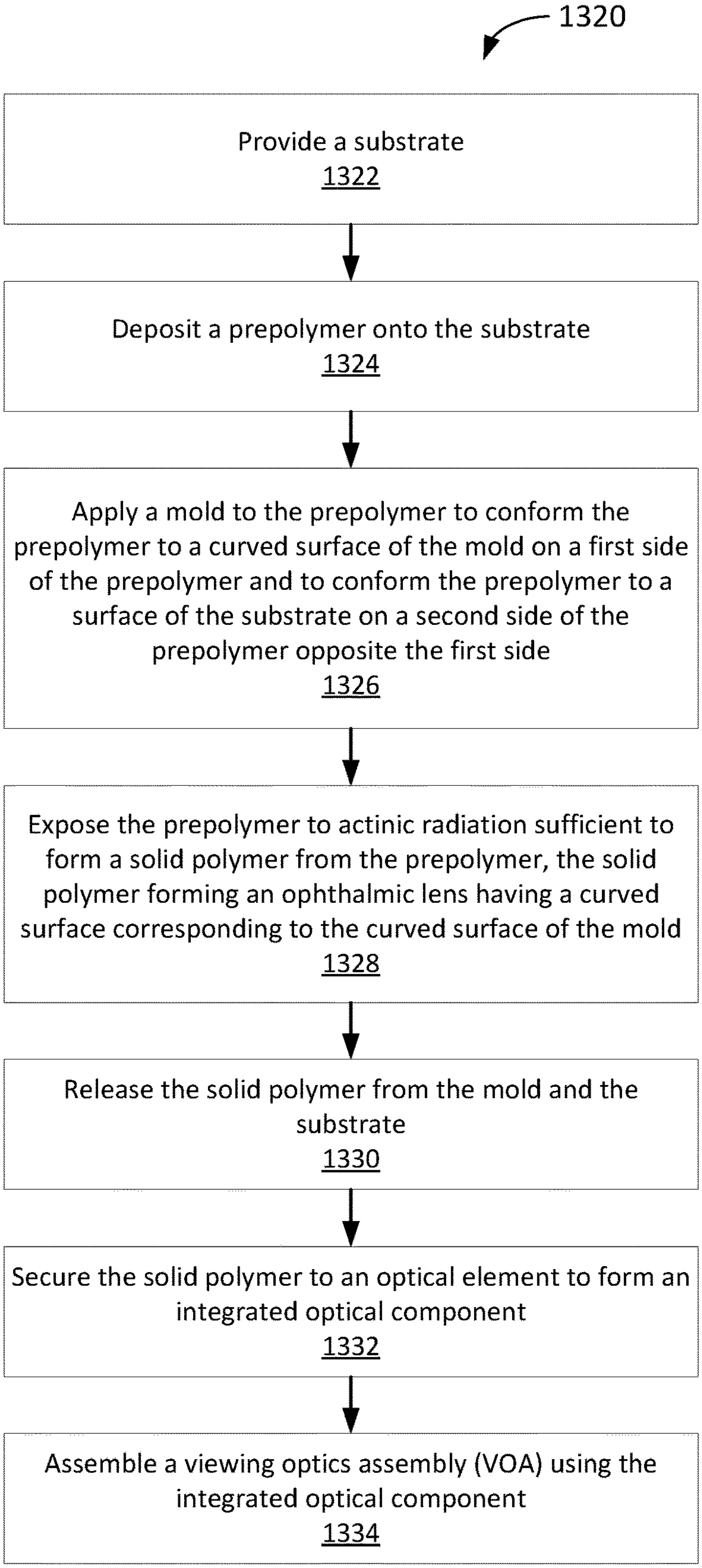

FIG. 13B shows another example process 1320 for forming a viewing optics assembly (VOA). The process 1320 can be performed, for example, at least part using the system 100 and/or the techniques shown in FIGS. 2A-8C). In some cases, the process 1320 can be used to produce VOAs suitable for use in optical applications (e.g., as a part of an optical imaging system, such as a heat mounted display device). In some implementations, the process 1320 can be performed to from at least a portion of the devices shown in FIGS. 9-12.

In the process 1320, a substrate is provided (block 1322). In some implementations, the substrate can be a mold or a portion thereof. Example molds are described with reference to FIGS. 1-8C.

Further, a prepolymer is deposited onto the substrate (block 1324). As an example a prepolymer can be deposited onto the substrate using a dispenser assembly 114, as described with reference to FIG. 1.

In some implementations, the prepolymer can include an epoxy vinyl ester and/or a cyclic aliphatic epoxy. In some implementations, the prepolymer can also include a photoinitiator or a co-reactant for promoting a curing of the prepolymer.

Further, a mold is applied to the prepolymer to conform the prepolymer to a curved surface of the mold on a first side of the prepolymer and to conform the prepolymer to a surface of the substrate on a second side of the prepolymer opposite the first side (block 1326). Example molds are described with reference to FIGS. 1-8C.

Further, while the mold is applied to the prepolymer, the prepolymer is exposed to actinic radiation sufficient to form a solid polymer from the prepolymer (block 1328). The solid polymer forms an ophthalmic lens having a curved surface corresponding to the curved surface of the mold. As an example, actinic radiation can be emitted onto the prepolymer using the light sources 104*a* and/or 104*b* described with reference to FIG. 1.

In some implementations, the prepolymer can be exposed to actinic radiation having a wavelength of 365 nm and an intensity between 0.1 $J/cm^2$ and 10 $J/cm^2$. In some implementations, the prepolymer can be exposed to actinic radiation having a wavelength between 310 nm and 410 nm, and an intensity between 0.1 $J/cm^2$ and 100 $J/cm^2$. Other wavelengths and/or intensities are also possible, depending on the implementation.

In some implementations, heat can also be applied to the prepolymer (e.g., concurrent with exposing the prepolymer to actinic radiation). In some implementations, the prepolymer can be heated a temperature between 40 °C and 120 °C. Other temperatures are also possible, depending on the implementation.

Further, the solid polymer is released from the mold and the substrate (block 1330). As an example, the mold can be withdrawn from the solid polymer, and the solid polymer can be extracted from between the mold and the substrate.

Further, the solid polymer is secured to an optical element to form an integrated optical component (block 1332).

In general, the optical element can be any component that is to be included as a portion of a viewing optics assembly (e.g., any layer or other component that is to be included in an optical stack). In some implementations, the optical element can include a segmented dimmer configured to selectively modulate an intensity of light transmitted by the VOA (e.g., a dimmer 910, as described with reference to FIG. 9). In some implementations, the optical element can include an illumination layer configured to emit light along an optical axis of the VOA (e.g., a waveguide 912, as described with reference to FIG. 9). In some implementations, the optical element can include at least one layer that is part of an eye tracking assembly configured to track a motion of a user's eye while the head mounted display is worn by the user (e.g., an eye tracking assembly 914, as described with reference to FIG. 9). In some implementations, the optical element can include one or more lenses (e.g., ophthalmic lenses).

In some implementations, the solid polymer can be secured to the optical element by applying a bonding agent to a surface of the optical element and/or applying the solid polymer onto the bonding agent. The bonding agent can include a liquid (e.g., for performing wet lamination) and/or a dry substance (e.g., performing dry lamination).

Further, a viewing optics assembly (VOA) is assembled using the integrated optical component (block 1334). As an example, the integrated optical component can be included as at least a portion of an optical stack (e.g., a stack of optical layers and/or other components).

Various types of ophthalmic lens can be formed using the process 1320.

As an example, the surface of the substrate can be planar. Further, the ophthalmic lens can include a planar surface corresponding to the planar surface of the substrate, where the planar surface of the ophthalmic lens is opposite the curved surface of the ophthalmic lens.

As another example, the surface of the substrate can be curved. Further, the ophthalmic lens can include a second curved surface corresponding to the curved surface of the substrate, where the second curved surface of the ophthalmic lens is opposite the curved surface of the ophthalmic lens.

As another example, the ophthalmic lens can include a Fresnel lens on a plano surface. In some implementations, the Fresnel lens can have a lens ridge height between 25 μm and 1000 μm.

As another example, the ophthalmic lens can have a positive optical power (e.g., an optical power in a range from +1 D to +1.5 D, or in a range from +0.5 D to +4 D). In some implementations, the ophthalmic lens can have a negative optical power (e.g., an optical power in a range from −1 D to −1.5 D, or in a range from −0.5 D to −4 D).

As another example, the ophthalmic lens can have a radius of curvature between 400 μm mm and 450 mm. Further, the ophthalmic lens can have an aperture size of between 25 mm and 50 mm. Further still, the ophthalmic lens can have a refractive index between 1.5 and 1.6.

As another example, the ophthalmic lens can have a radius of curvature greater than 200 mm. Further, the ophthalmic lens can have an aperture size greater than 5 mm. Further still, the ophthalmic lens can have a refractive index between 1.5 and 1.75.

As another example, the ophthalmic lens can have an aperture size of between 25 mm and 95 mm.

As another example, the ophthalmic lens can have a radius of curvature between 150 mm and 1000 mm. Further, the ophthalmic lens can have a minimum focal length of 25 cm. In some implementations, the ophthalmic lens can have a focal length between 25 cm and 2 m.

In some implementations, prior to securing the solid polymer to the optical element, the optical element can be cleaned (e.g., using a cleaning assembly 110, as described with reference to FIG. 1). Cleaning the optical element can include applying an aqueous acidic solution and an aqueous basic solution to the surface of the optical element, applying an organic solvent to the surface of the optical element, sonicating the surface of the optical element, exposing the surface of the optical element to a plasma, and/or exposing the surface of the optical element to ultraviolet light and/or ozone.

In some implementations, prior to securing the solid polymer to the optical element, a material can be deposited onto the surface of the optical element using vapor deposition (e.g., using a vapor deposition assembly 112, as described with reference to FIG. 1). In some implementations, the material can include a silane coupling agent.

In some implementations, the prepolymer can include a photochromic material.

In some implementations, the prepolymer can include an electrochromic material.

Example Systems

As described above, the systems and techniques described herein can be used to produce optical components for a head mounted display device. An example head mounted display device 1460 is shown in FIG. 14.

Figure 14:
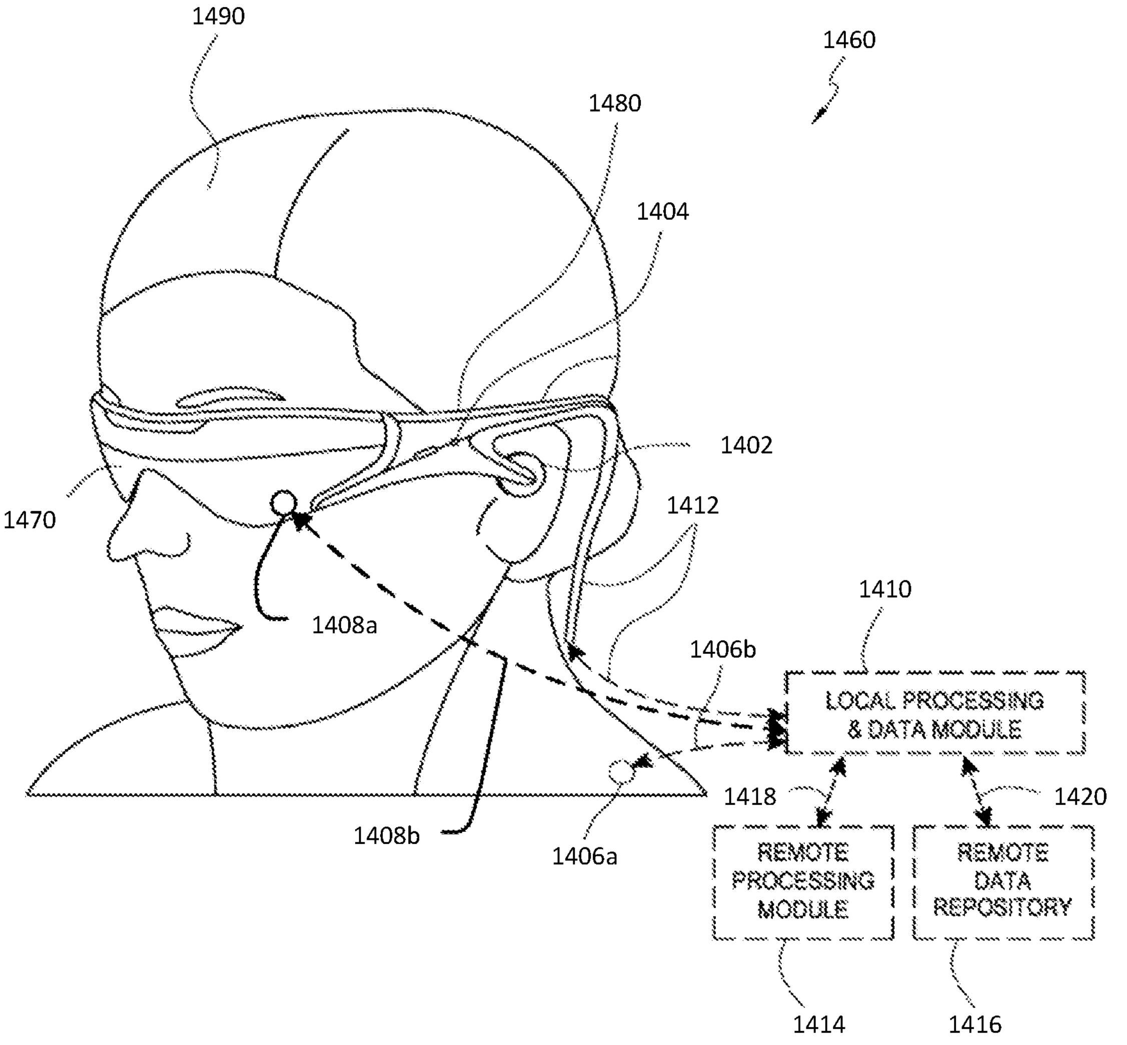
FIG. 14 is a diagram of an example head mounted display device.

FIG. 14 illustrates an example head mounted display system 1460 that includes a see-through display 1470, and various mechanical and electronic modules and systems to support the functioning of that display 1470. The display 1470 is housed in a frame 1480, which is wearable by a display system user 1490 and which is configured to position the display 1470 in front of the eyes of the user 1490. The display 1470 includes an eyepiece and may be considered eyewear in some embodiments. In some embodiments, a speaker 1402 is coupled to the frame 1480 and is positioned adjacent the ear canal of the user 1490. The display system may also include one or more microphones 1404 to detect sound. The microphone 1404 can allow the user to provide inputs or commands to the system 1460 (e.g., the selection of voice menu commands, natural language questions, etc.), and/or can allow audio communication with other persons (e.g., with other users of similar display systems). The microphone 1404 can also collect audio data from the user's surroundings (e.g., sounds from the user and/or environment). In some embodiments, the display system may also include a peripheral sensor 1406*a*, which may be separate from the frame 1480 and attached to the body of the user 1490 (e.g., on the head, torso, an extremity, etc.). The peripheral sensor 1406*a* may acquire data characterizing the physiological state of the user 90 in some embodiments.

In some embodiments, the display system may also include an eye-tracking module 1408*a*. In some embodiments, the eye-tracking module 1408*a* can include a biometric identification module to acquire biometric data of the user 1490. In some embodiments, the biometric identification module can be an iris identification module.

In some embodiments, the eye-tracking module 1408*a* may acquire depth-of-fixation data. The eye-tracking module 1408*a* may be operatively coupled by communications link 1408*b* (e.g., a wired lead or wireless connectivity) to the local processor and data module 1410. The eye-tracking module 1408*a* may communicate the biometric and depth-of-fixation data to the local processor and data module 1410.

The display 1470 is operatively coupled by a communications link 1412, such as by a wired lead or wireless connectivity, to the local processor and data module 1410, which may be mounted in a variety of configurations, such as fixedly attached to the frame 1480, fixedly attached to a helmet or hat worn by the user, embedded in headphones, or removably attached to the user 1490 (e.g., in a backpack-style configuration or in a belt-coupling style configuration). Similarly, the sensor 1406*a* may be operatively coupled by communications link 1406*b* (e.g., a wired lead or wireless connectivity) to the local processor and data module 1410. The local processing and data module 1410 may include a hardware processor, as well as digital memory, such as non-volatile memory (e.g., flash memory or a hard disk drive), both of which may be utilized to assist in the processing, caching, and storage of data. The data may include data 1) captured from sensors (which may be, e.g., operatively coupled to the frame 1480 or otherwise attached to the user 1490), such as image capture devices (e.g., cameras), microphones, inertial measurement units, accelerometers, compasses, GPS units, radio devices, gyros, and/or other sensors disclosed herein; and/or 2) acquired and/or processed using a remote processing module 1414 and/or a remote data repository 1416 (including data relating to virtual content), possibly for passage to the display 1470 after such processing or retrieval. The local processing and data module 1410 may be operatively coupled by communication links 1418, 1420, such as via a wired or wireless communication links, to the remote processing module 1414 and the remote data repository 1416 such that these remote modules 1414, 1416 are operatively coupled to each other and available as resources to the local processing and data module 1410. In some embodiments, the local processing and data module 1410 may include one or more of the image capture devices, microphones, inertial measurement units, accelerometers, compasses, GPS units, radio devices, and/or gyros. In some other embodiments, one or more of these sensors may be attached to the frame 1480, or may be standalone devices that communicate with the local processing and data module 1410 by wired or wireless communication pathways.

The remote processing module 1414 may include one or more processors to analyze and process data, such as image and audio information. In some embodiments, the remote data repository 1414 may be a digital data storage facility, which may be available through the internet or other networking configuration in a "cloud" resource configuration. In some embodiments, the remote data repository 1414 may include one or more remote servers, which provide information (e.g., information for generating augmented reality content) to the local processing and data module 1410 and/or the remote processing module 1414. In other embodiments, all data is stored and all computations are performed in the local processing and data module, allowing fully autonomous use from a remote module.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

Although the disclosed inventive concepts include those defined in the attached claims, it should be understood that the inventive concepts can also be defined in accordance with the following embodiments.

In addition to the embodiments of the attached claims and the embodiments described above, the following numbered embodiments are also innovative.

Embodiment 1 is a method of forming a viewing optics assembly (VOA) for a head mounted display, the method comprising: providing a substrate comprising a first optical element for the VOA; depositing a prepolymer onto the substrate; applying a mold to the prepolymer to conform the prepolymer to a curved surface of the mold on a first side of the prepolymer and to conform the prepolymer to a surface of the substrate on a second side of the prepolymer opposite the first side; while applying the mold to the prepolymer, exposing the prepolymer to actinic radiation sufficient to form a solid polymer from the prepolymer, the solid polymer forming an ophthalmic lens having a curved surface corresponding to the curved surface of the mold, the substrate and the ophthalmic lens forming an integrated optical component; releasing the mold from the solid polymer; and assembling the VOA using the integrated optical component.

Embodiment 2 is the method of Embodiment 1, wherein the first optical element comprises a segmented dimmer configured to selectively modulate an intensity of light transmitted by the VOA.

Embodiment 3 is the method of Embodiment 1 or 2, wherein the first optical element comprises an illumination layer configured to emit light along an optical axis of the VOA.

Embodiment 4 is the method of any one of Embodiments 1-3, wherein the first optical element comprises at least one layer that is part of an eye tracking assembly configured to track a motion of a user's eye while the head mounted display is worn by the user.

Embodiment 5 is the method of any one of Embodiments 1-4, wherein the first optical element comprises one or more lenses.

Embodiment 6 is the method of any one of Embodiments 1-5, further comprising: prior to depositing the prepolymer onto the substrate, cleaning the surface of the substrate.

Embodiment 7 is the method of any one of Embodiments 1-6, wherein cleaning the substrate comprises at least one of: applying an aqueous acidic solution and an aqueous basic solution to the surface of the substrate, applying an organic solvent to the surface of the substrate, sonicating the surface of the substrate, exposing the surface of the substrate to a plasma, or exposing the surface of the substrate to ultraviolet light and/or ozone.

Embodiment 8 is the method of any one of Embodiments 1-7, further comprising: prior to depositing the prepolymer onto the substrate, depositing a material onto the surface of the substrate using vapor deposition.

Embodiment 8 is the method of any one of Embodiments 1-8, wherein the material comprises a silane coupling agent.

Embodiment 10 is the method of any one of Embodiments 1-9, further comprising: prior to depositing the prepolymer onto the substrate, depositing a material onto the surface of the substrate using liquid deposition, wherein the material comprises a monomer having one or more functional groups.

Embodiment 11 is the method of any one of Embodiments 1-10, wherein the one or more functional groups comprise at least one of alkyl, carboxyl, carbonyl, hydroxyl, or alkoxy.

Embodiment 12 is the method of any one of Embodiments 1-11, wherein the material is deposited onto the surface of the substrate by at least one of: ink jetting the material onto the surface, spin coating the material onto the surface, or spraying the material onto the surface.

Embodiment 13 is the method of any one of Embodiments 1-12, wherein the prepolymer comprises at least one of: an epoxy vinyl ester, or cyclic aliphatic epoxy.

Embodiment 14 is the method of any one of Embodiments 1-13, the prepolymer further comprises at least one of a photoinitiator or a co-reactant for promoting a curing of the prepolymer.

Embodiment 15 is the method of any one of Embodiments 1-14, wherein exposing the prepolymer to actinic radiation comprises: exposing the prepolymer to actinic radiation having a wavelength of 365 nm and an intensity between 0.1 $J/cm^2$ and 10 $J/cm^2$.

Embodiment 16 is the method of any one of Embodiments 1-15, wherein exposing the prepolymer to actinic radiation comprises: exposing the prepolymer to actinic radiation having a wavelength between 310 nm and 410 nm and an intensity between 0.1 $J/cm^2$ and 100 $J/cm^2$.

Embodiment 17 is the method of any one of Embodiments 1-16, further comprising, while exposing the prepolymer to actinic radiation, applying heat of the prepolymer.

Embodiment 18 is the method of any one of Embodiments 1-17, wherein applying heat of the prepolymer comprises: heating the prepolymer to a temperature between 40 °C and 120 °C Embodiment 19 is the method of any one of Embodiments 1-18, wherein the surface of the substrate is planar, and wherein the ophthalmic lens comprises a planar surface corresponding to the planar surface of the substrate, and wherein the planar surface of the ophthalmic lens is opposite the curved surface of the ophthalmic lens.

Embodiment 20 is the method of any one of Embodiments 1-19, wherein the surface of the substrate is curved, and wherein the ophthalmic lens comprises a second curved surface corresponding to the curved surface of the substrate, wherein the second curved surface of the ophthalmic lens is opposite the curved surface of the ophthalmic lens.

Embodiment 21 is the method of any one of Embodiments 1-20, wherein the ophthalmic lens has an optical power in a range from +1 D to +1.5 D.

Embodiment 22 is the method of any one of Embodiments 1-21, wherein the ophthalmic lens has an optical power in a range from −1 D to −1.5 D.

Embodiment 23 is the method of any one of Embodiments 1-22, wherein the ophthalmic lens has an optical power in a range from +0.5 D to +4 D.

Embodiment 24 is the method of any one of Embodiments 1-23, wherein the ophthalmic lens has an optical power in a range from −0.5 D to −4 D.

Embodiment 25 is the method of any one of Embodiments 1-24, wherein the ophthalmic lens has a radius of curvature between 400 mm and 450 mm.

Embodiment 26 is the method of any one of Embodiments 1-25, wherein the ophthalmic lens has an aperture size of between 25 mm and 50 mm.

Embodiment 27 is the method of any one of Embodiments 1-26, wherein the ophthalmic lens has an aperture size of between 25 mm and 95 mm.

Embodiment 28 is the method of any one of Embodiments 1-27, wherein the ophthalmic lens has a refractive index between 1.5 and 1.6.

Embodiment 29 is the method of any one of Embodiments 1-28, wherein the ophthalmic lens has a radius of curvature greater than 200 mm.

Embodiment 30 is the method of any one of Embodiments 1-29, wherein the ophthalmic lens has an aperture size greater than 5 mm.

Embodiment 31 is the method of any one of Embodiments 1-30, wherein the ophthalmic lens has a refractive index between 1.5 and 1.75.

Embodiment 32 is the method of any one of Embodiments 1-31, wherein the ophthalmic lens has a radius of curvature between 150 mm and 1000 mm.

Embodiment 33 is the method of any one of Embodiments 1-32, wherein the ophthalmic lens has a focal length between 25 cm and 2 m.

Embodiment 34 is the method of any one of Embodiments 1-33, wherein the ophthalmic lens comprises a Fresnel lens on a plano surface.

Embodiment 35 is the method of any one of Embodiments 1-34, wherein the Fresnel lens has a lens ridge height between 25 μm and 1000 μm.

Embodiment 36 is the method of any one of Embodiments 1-35, further comprising: applying at least one of an anti-reflecting coating or a protective coating to a surface of the integrated optical component.

Embodiment 37 is the method of any one of Embodiments 1-36, wherein at least one of the prepolymer or the substrate comprises a photochromic material.

Embodiment 38 is the method of any one of Embodiments 1-37, wherein at least one of the prepolymer or the substrate comprises an electrochromic material.

Embodiment 39 is a method of forming a viewing optics assembly (VOA) for a head mounted display, the method comprising: providing a substrate; depositing a prepolymer onto the substrate; applying a mold to the prepolymer to conform the prepolymer to a curved surface of the mold on a first side of the prepolymer and to conform the prepolymer to a surface of the substrate on a second side of the prepolymer opposite the first side; while applying the mold to the prepolymer, exposing the prepolymer to actinic radiation sufficient to form a solid polymer from the prepolymer, the solid polymer forming an ophthalmic lens having a curved surface corresponding to the curved surface of the mold; releasing the solid polymer from the mold and the substrate; securing the solid polymer to an optical element to form an integrated optical component; and assembling the VOA using the integrated optical component.

Embodiment 40 is the method of Embodiment 39, wherein securing the solid polymer to the optical element comprises: applying a bonding agent to a surface of the optical element, and applying the solid polymer onto the bonding agent.

Embodiment 41 is the method of Embodiment 39 and 40, wherein the bonding agent comprises a liquid.

Embodiment 42 is the method of any one of Embodiments 39-41, wherein the bonding agent comprises a dry substance.

Embodiment 43 is the method of any one of Embodiments 39-42, wherein the optical element comprises a segmented dimmer configured to selectively modulate an intensity of light transmitted by the VOA.

Embodiment 44 is the method of any one of Embodiments 39-43, wherein the optical element comprises an illumination layer configured to emit light along an optical axis of the VOA.

Embodiment 45 is the method of any one of Embodiments 39-44, wherein the optical element comprises at least one layer that is part of an eye tracking assembly configured to track a motion of a user's eye while the head mounted display is worn by the user.

Embodiment 46 is the method of any one of Embodiments 39-45, wherein the optical element comprises one or more lenses.

Embodiment 47 is the method of any one of Embodiments 39-46, further comprising: prior to securing the solid polymer to the optical element, cleaning the optical element.

Embodiment 48 is the method of any one of Embodiments 39-47, wherein cleaning the optical element comprises at least one of: applying an aqueous acidic solution and an aqueous basic solution to a surface of the optical element, applying an organic solvent to the surface of the surface of the optical element, sonicating the surface of the surface of the optical element, exposing the surface of the surface of the optical element to plasma, or exposing the surface of the optical element to ultraviolet light and/or ozone.

Embodiment 49 is the method of any one of Embodiments 39-48, further comprising: prior to securing the solid polymer to the optical element, depositing a material onto the optical element using vapor deposition.

Embodiment 50 is the method of any one of Embodiments 39-49, wherein the material comprises a silane coupling agent.

Embodiment 51 is the method of any one of Embodiments 39-50, wherein the prepolymer comprises at least one of: an epoxy vinyl ester, or cyclic aliphatic epoxy.

Embodiment 52 is the method of any one of Embodiments 39-51, wherein the prepolymer further comprises at least one of a photoinitiator or a co-reactant for promoting a curing of the prepolymer.

Embodiment 53 is the method of any one of Embodiments 39-52, wherein exposing the prepolymer to actinic radiation comprises: exposing the prepolymer to actinic radiation having a wavelength of 365 nm and an intensity between 0.1 $J/cm^2$ and 10 $J/cm^2$.

Embodiment 54 is the method of any one of Embodiments 39-53, wherein exposing the prepolymer to actinic radiation comprises: exposing the prepolymer to actinic radiation having a wavelength between 310 nm and 410 nm and an intensity between 0.1 $J/cm^2$ and 100 $J/cm^2$.

Embodiment 55 is the method of any one of Embodiments 39-54, while exposing the prepolymer to actinic radiation, applying heat of the prepolymer.

Embodiment 56 is the method of any one of Embodiments 39-55, where applying heat of the prepolymer comprises: heating the prepolymer to a temperature between 40 °C and 120 °C.

Embodiment 57 is the method of any one of Embodiments 39-56, wherein the surface of the substrate is planar, and wherein the ophthalmic lens comprises a planar surface corresponding to the planar surface of the substrate, and wherein the planar surface of the ophthalmic lens is opposite the curved surface of the ophthalmic lens.

Embodiment 58 is the method of any one of Embodiments 39-57, wherein the surface of the substrate is curved, and wherein the ophthalmic lens comprises a second curved surface corresponding to the curved surface of the substrate, wherein the second curved surface of the ophthalmic lens is opposite the curved surface of the ophthalmic lens.

Embodiment 59 is the method of any one of Embodiments 39-58, wherein the ophthalmic lens has an optical power in a range from +1 D to +1.5 D.

Embodiment 60 is the method of any one of Embodiments 39-59, wherein the ophthalmic lens has an optical power in a range from −1 D to −1.5 D.

Embodiment 61 is the method of any one of Embodiments 39-60, wherein the ophthalmic lens has an optical power in a range from +0.5 D to +4 D.

Embodiment 62 is the method of any one of Embodiments 39-61, wherein the ophthalmic lens has an optical power in a range from −0.5 D to −4 D.

Embodiment 63 is the method of any one of Embodiments 39-62, wherein the ophthalmic lens has a radius of curvature between 400 mm and 450 mm.

Embodiment 64 is the method of any one of Embodiments 39-63, wherein the ophthalmic lens has an aperture size of between 25 mm and 50 mm.

Embodiment 65 is the method of any one of Embodiments 39-64, wherein the ophthalmic lens has a refractive index between 1.5 and 1.6.

Embodiment 66 is the method of any one of Embodiments 39-65, wherein the ophthalmic lens has a radius of curvature greater than 200 mm.

Embodiment 67 is the method of any one of Embodiments 39-66, wherein the ophthalmic lens has an aperture size greater than 5 mm.

Embodiment 68 is the method of any one of Embodiments 39-67, wherein the ophthalmic lens has a refractive index between 1.5 and 1.75.

Embodiment 69 is the method of any one of Embodiments 39-68, wherein the ophthalmic lens has a radius of curvature between 150 mm and 1000 mm.

Embodiment 70 is the method of any one of Embodiments 39-69, wherein the ophthalmic lens has a focal length between 25 cm and 2 m.

Embodiment 71 is the method of any one of Embodiments 39-70, wherein the ophthalmic lens comprises a Fresnel lens on a plano surface.

Embodiment 72 is the method of any one of Embodiments 39-71, wherein the Fresnel lens has a lens ridge height between 25 μm and 1000 μm.

Embodiment 73 is the method of any one of Embodiments 39-72, wherein the prepolymer comprises a photochromic material.

Embodiment 74 is the method of any one of Embodiments 39-73, wherein the prepolymer comprises an electrochromic material.

Embodiment 75 is a viewing optics assembly (VOA) for a head mounted display, comprising: an eyepiece configured to display images toward a user side of the head mounted display during use of the head mounted display; and an integrated optical component arranged on a world side of the eyepiece, the integrated optical component comprising a segmented dimmer and an ophthalmic lens disposed on a surface of the segmented dimmer, the ophthalmic lens having a convex surface and an optical power in a range from +0.5 D to +4 D.

Embodiment 76 is the VOA of Embodiment 75, wherein the segmented dimmer comprises one or more dimmer layers configured to selectively modulate an intensity of light transmitted along an optical axis of the VOA.

Embodiment 77 is the VOA of Embodiment 75 or 76, wherein the integrated optical component is configured to focus at least some of the light emitted by the eyepiece onto an eye of the user during use of the head mounted display.

Embodiment 78 is the method of any one of Embodiments 75-77, further comprising: one or more electrical traces disposed between the segmented dimmer and the ophthalmic lens.

Embodiment 79 is the VOA of any one of Embodiments 75-78, wherein the segmented dimmer comprises a first layer comprising an electrochromic material.

Embodiment 80 is the VOA of any one of Embodiments 75-79, wherein the segmented dimmer comprises a first electrically conductive layer and a second electrically conductive layer, wherein the first layer is disposed between the first electrically conductive layer and the second electrically conductive layer.

Embodiment 81 is the VOA of any one of Embodiments 75-80, wherein the segmented dimmer comprises an ion transfer layer disposed between the first layer and the second electrically conductive layer.

Embodiment 82 is the VOA of any one of Embodiments 75-81, wherein the segmented dimmer comprises an ion storage layer disposed between the ion transfer layer and the second electrically conductive layer.

Embodiment 83 is a viewing optics assembly (VOA) for a head mounted display, comprising: an eyepiece configured to display images toward a user side of the head mounted display during use of the head mounted display; and an integrated optical component arranged on the user side of the eyepiece, the integrated optical component comprising an illumination layer and an ophthalmic lens disposed on a surface of the illumination layer, the ophthalmic lens having a concave surface and an optical power in a range from −0.5 D to −4 D.

Embodiment 84 is the VOA of Embodiment 83, wherein the illumination layer is configured to emit light along an optical axis of the VOA.

Embodiment 85 is the VOA of Embodiment 83 or 84, wherein the integrated optical component is configured 85 focus at least some of the light emitted by the eyepiece onto an eye of the user during use of the head mounted display.

Embodiment 86 is the VOA of any one of Embodiments 83-85, further comprising: one or more electrical traces disposed between the segmented dimmer and the ophthalmic lens.

Embodiment 87 is the VOA of any one of Embodiments 83-86, wherein the ophthalmic lens comprises a photochromic material.

Embodiment 88 is the VOA of any one of Embodiments 83-87, wherein the ophthalmic lens comprises an electrochromic material.

The embodiments described herein may provide one or more of the following technical advantages or effects. For example, the embodiments can be beneficial in producing head mounted displays having enhanced optical performance characteristics. For instance, head mounted displays having optical components produced according to the described embodiments can be used to present visual content according to a wide field of view (or volume of view) and/or according to a high degree of visual fidelity (e.g., by eliminating or otherwise reducing the degree of haze or light scattering that could adversely impact the visual quality of the displayed content). Further, the described embodiments can enable head mounted displays to be produced more quickly and/or at a lower cost (e.g., by reducing the complexity of the display and/or the number of steps that are performed to produce the display). Further, the described embodiments can be used to produce head mounted display that are less bulky and more comfortable for users to wear.

A number of implementations have been described. Nevertheless, it will be understood that various modifications may be made without departing from the spirit and scope of the invention. Accordingly, other implementations are within the scope of the following claims.

What is claimed is:

1. A method of forming a viewing optics assembly (VOA) for a head mounted display, the method comprising:
- providing a substrate comprising a first optical element for the VOA;
- depositing a prepolymer onto the substrate;
- after depositing the prepolymer, contacting the prepolymer with a mold to conform the prepolymer to a curved surface of the mold on a first side of the prepolymer and to conform the prepolymer to a surface of the substrate on a second side of the prepolymer opposite the first side;
- while contacting the prepolymer with the mold, exposing the prepolymer to actinic radiation sufficient to form a solid polymer from the prepolymer, the solid polymer forming an ophthalmic lens having a curved surface corresponding to the curved surface of the mold, the substrate and the ophthalmic lens forming an integrated optical component;
- releasing the mold from the solid polymer; and
- assembling the VOA using the integrated optical component.

2. The method of claim 1, wherein the first optical element comprises at least one of:
- a segmented dimmer configured to selectively modulate an intensity of light transmitted by the VOA, or
- an illumination layer configured to emit light along an optical axis of the VOA.

3. The method of claim 1, further comprising:
- prior to depositing the prepolymer onto the substrate, cleaning the surface of the substrate, wherein cleaning the surface of the substrate comprises at least one of:
  - applying an aqueous acidic solution and an aqueous basic solution to the surface of the substrate,
  - applying an organic solvent to the surface of the substrate, sonicating the surface of the substrate,
  - exposing the surface of the substrate to a plasma, or
  - exposing the surface of the substrate to ultraviolet light and/or ozone.

4. The method of claim 1, comprising:
- prior to depositing the prepolymer onto the substrate, depositing a material onto the surface of the substrate using vapor deposition, wherein the material comprises a silane coupling agent.

5. The method of claim 4, comprising:
- prior to depositing the prepolymer onto the substrate, depositing a material onto the surface of the substrate using liquid deposition, wherein the material comprises a monomer having one or more functional groups,
- wherein the one or more functional groups comprise at least one of alkyl, carboxyl, carbonyl, hydroxyl, or alkoxy, and
- wherein the material is deposited onto the surface of the substrate by at least one of:
  - ink jetting the material onto the surface,
  - spin coating the material onto the surface, or
  - spraying the material onto the surface.

6. The method of claim 1, wherein the prepolymer comprises at least one of:
- an epoxy vinyl ester, or
- cyclic aliphatic epoxy, and
- wherein the prepolymer further comprises at least one of a photoinitiator or a co-reactant for promoting a curing of the prepolymer.

7. The method of claim 1, wherein exposing the prepolymer to actinic radiation comprises:
- exposing the prepolymer to actinic radiation having a wavelength between 310 nm and 410 nm and an intensity between 0.1 $J/cm^2$ and 100 $J/cm^2$.

8. The method of claim 1, further comprising, while exposing the prepolymer to actinic radiation, applying heat to the prepolymer, wherein applying heat to the prepolymer comprises heating the prepolymer to a temperature between 40 °C and 120 °C.

9. The method of claim 1, wherein the surface of the substrate is planar, the ophthalmic lens comprises a planar surface corresponding to the planar surface of the substrate, and the planar surface of the ophthalmic lens is opposite the curved surface of the ophthalmic lens.

10. The method of claim 1, wherein the surface of the substrate is curved, the ophthalmic lens comprises a second curved surface corresponding to the curved surface of the substrate, and the second curved surface of the ophthalmic lens is opposite the curved surface of the ophthalmic lens.

11. The method of claim 1, wherein the ophthalmic lens has an optical power in a range from at least one of:
- +1 D to +1.5 D,
- −1 D to −1.5 D,
- +0.5 D to +4 D, or
- 0.5 D to −4 D.

12. The method of claim 1, wherein the ophthalmic lens has a radius of curvature greater than 200 mm, an aperture size greater than 5 mm, a refractive index between 1.5 and 1.75, and a focal length between 25 cm and 2 m.

13. The method of claim 1, wherein the ophthalmic lens comprises a Fresnel lens on a plano surface.

14. The method of claim 13, wherein the Fresnel lens has a lens ridge height between 25 μm and 1000 μm.

15. The method of claim 1, further comprising:
- applying at least one of an anti-reflecting coating or a protective coating to a surface of the integrated optical component.

16. The method of claim 1, wherein at least one of the prepolymer or the substrate comprises at least one of:
- a photochromic material, or
- an electrochromic material.

17. The method of claim 1, wherein the first optical element comprises at least one layer that is part of an eye tracking assembly configured to track a motion of a user's eye while the head mounted display is worn by the user.

18. The method of claim 1, wherein the first optical element comprises one or more lenses.

19. A method of forming a viewing optics assembly (VOA) for a head mounted display, the method comprising:

providing a substrate;

depositing a prepolymer onto the substrate;

after depositing the prepolymer, contacting the prepolymer with a mold to conform the prepolymer to a curved surface of the mold on a first side of the prepolymer and to conform the prepolymer to a surface of the substrate on a second side of the prepolymer opposite the first side;

while contacting the prepolymer with the mold, exposing the prepolymer to actinic radiation sufficient to form a solid polymer from the prepolymer, the solid polymer forming an ophthalmic lens having a curved surface corresponding to the curved surface of the mold;

releasing the solid polymer from the mold and the substrate;

securing the solid polymer to an optical element to form an integrated optical component; and assembling the VOA using the integrated optical component.

20. A viewing optics assembly (VOA) for a head mounted display, comprising:

an eyepiece configured to display images toward a user side of the head mounted display during use of the head mounted display; and an integrated optical component arranged on a world side of the eyepiece, the integrated optical component comprising a segmented dimmer and an ophthalmic lens disposed on a surface of the segmented dimmer, the ophthalmic lens having a convex surface and an optical power in a range from +0.5 D to +4 D, wherein the segmented dimmer is configured to selectively modulate an intensity of light transmitted by the VOA.

21. A viewing optics assembly (VOA) for a head mounted display, comprising:

an eyepiece configured to display images toward a user side of the head mounted display during use of the head mounted display; and an integrated optical component arranged on the user side of the eyepiece, the integrated optical component comprising an illumination layer and an ophthalmic lens disposed on a surface of the illumination layer, the ophthalmic lens having a concave surface and an optical power in a range from −0.5 D to −4 D, wherein the illumination layer is configured to emit light along an optical axis of the VOA.

* * * * *